US008179254B2

(12) United States Patent
Hyde et al.

(10) Patent No.: US 8,179,254 B2
(45) Date of Patent: May 15, 2012

(54) ACTUATABLE CUSHIONING ELEMENTS

(75) Inventors: Roderick A. Hyde, Redmond, WA (US);
Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA
(US); Lowell L. Wood, Jr., Bellevue,
WA (US)

(73) Assignee: The Invention Science Fund I, LLC,
Bellevue, WA (US)

( * ) Notice: Subject to any disclaimer, the term of this
patent is extended or adjusted under 35
U.S.C. 154(b) by 1119 days.

(21) Appl. No.: 11/726,706

(22) Filed: Mar. 21, 2007

(65) Prior Publication Data
US 2008/0117042 A1 May 22, 2008

Related U.S. Application Data

(63) Continuation-in-part of application No. 11/603,965,
filed on Nov. 21, 2006, and a continuation-in-part of
application No. 11/136,339, filed on May 24, 2005.

(51) Int. Cl.
*G08B 21/00* (2006.01)
(52) U.S. Cl. ......... 340/540; 180/271; 180/274; 180/282
(58) Field of Classification Search .............. 701/45–47;
206/521–594; 280/728.1–743.1, 734, 735;
340/540; 180/271, 282
See application file for complete search history.

(56) References Cited

U.S. PATENT DOCUMENTS

| 3,398,406 | A |   | 8/1968  | Waterbury              |
|-----------|---|---|---------|------------------------|
| 3,889,970 | A |   | 6/1975  | Astheimer et al.       |
| 3,960,386 | A |   | 6/1976  | Wallsten               |
| 4,287,250 | A |   | 9/1981  | Rudy                   |
| 4,817,902 | A |   | 4/1989  | Mason                  |
| 4,825,625 | A |   | 5/1989  | Hufford                |
| 4,875,548 | A |   | 10/1989 | Lorsbach               |
| 4,977,623 | A |   | 12/1990 | DeMarco                |
| 5,005,240 | A |   | 4/1991  | Vrzalik                |
| 5,052,065 | A |   | 10/1991 | West                   |
| 5,054,811 | A |   | 10/1991 | Unterforsthuber et al. |
| 5,150,767 | A |   | 9/1992  | Miller                 |
| 5,181,697 | A |   | 1/1993  | Rumer                  |
| 5,202,831 | A | * | 4/1993  | Blackburn et al. ............. 701/46 |
| 5,203,427 | A |   | 4/1993  | Williams, Sr. et al.   |

(Continued)

FOREIGN PATENT DOCUMENTS

DE    195 41 998 A1    5/1997

(Continued)

OTHER PUBLICATIONS

U.S. Appl. No. 11/868,416, Hyde et al.

(Continued)

*Primary Examiner* — Benjamin C Lee
*Assistant Examiner* — Peter Mehravari

(57) ABSTRACT

An apparatus, methods and computer program product, and system are described that enable a first subset of actuatable cushioning elements for a first time period, enable a second subset of actuatable cushioning elements for a second time period, determine an event, and actuate, based on a time the event is determined, at least one of the first and the second subsets of actuatable cushioning elements to provide cushioning support for an object. Other example embodiments are also provided relating to actuatable cushioning elements.

22 Claims, 24 Drawing Sheets

U.S. PATENT DOCUMENTS

| | | | |
|---|---|---|---|
| 5,299,397 A | | 4/1994 | Ahern |
| 5,308,113 A | | 5/1994 | Moriset |
| 5,362,098 A | | 11/1994 | Guill |
| 5,372,429 A | | 12/1994 | Beaver, Jr. et al. |
| 5,478,114 A | | 12/1995 | Maurer et al. |
| 5,592,705 A | | 1/1997 | West |
| 5,803,263 A | | 9/1998 | Pozzo |
| 5,810,385 A | | 9/1998 | Henseler et al. |
| 5,879,767 A | | 3/1999 | Matsushima et al. |
| 5,881,407 A | | 3/1999 | Chu Pt |
| 5,937,443 A | | 8/1999 | Kageyama et al. |
| 5,945,912 A | | 8/1999 | Guldbrand |
| 5,960,494 A | | 10/1999 | Gilliland et al. |
| 6,125,478 A | | 10/2000 | Alaloof |
| 6,139,052 A | * | 10/2000 | Preamprasitchai ............ 280/735 |
| 6,160,478 A | | 12/2000 | Jacobsen et al. |
| 6,181,998 B1 | * | 1/2001 | Kanameda et al. ............. 701/45 |
| 6,219,605 B1 | | 4/2001 | Bauer et al. |
| 6,231,075 B1 | | 5/2001 | Otsu |
| 6,233,761 B1 | | 5/2001 | Neff |
| 6,314,596 B1 | | 11/2001 | Neff |
| 6,341,473 B1 | | 1/2002 | Kovacs et al. |
| 6,359,568 B1 | | 3/2002 | Johnson |
| 6,371,510 B1 | | 4/2002 | Marriott et al. |
| 6,382,660 B1 | | 5/2002 | Starner et al. |
| 6,396,427 B1 | | 5/2002 | Mattes et al. |
| 6,419,262 B1 | | 7/2002 | Fendt et al. |
| 6,447,006 B1 | | 9/2002 | Hess et al. |
| 6,594,835 B2 | | 7/2003 | West |
| 6,766,535 B2 | | 7/2004 | Duhamell et al. |
| 6,769,571 B2 | | 8/2004 | Mino |
| 6,792,342 B2 | | 9/2004 | Breed et al. |
| 6,848,708 B2 | | 2/2005 | Green et al. |
| 6,964,451 B1 | | 11/2005 | Bergey |
| 7,017,195 B2 | * | 3/2006 | Buckman et al. ................. 2/455 |
| 7,018,495 B2 | | 3/2006 | Kannankeril et al. |
| 7,025,376 B2 | | 4/2006 | Dominissini |
| 7,032,924 B2 | | 4/2006 | Brewster et al. |
| 7,209,221 B2 | | 4/2007 | Breed et al. |
| 7,267,367 B2 | | 9/2007 | Barvosa-Carter et al. |
| 7,320,379 B2 | | 1/2008 | Gila et al. |
| 7,354,410 B2 | | 4/2008 | Perry et al. |
| 7,356,358 B2 | | 4/2008 | Sakai |
| 7,409,735 B2 | | 8/2008 | Kramer et al. |
| 7,444,698 B2 | | 11/2008 | Jackson, III |
| 7,481,453 B2 | | 1/2009 | Breed |
| 7,548,168 B2 | | 6/2009 | Ishikawa et al. |
| 7,806,221 B2 | * | 10/2010 | Mishra .......................... 180/274 |
| 7,984,939 B2 | * | 7/2011 | Vodavoz ........................ 293/107 |
| 2001/0049840 A1 | | 12/2001 | Atanasio |
| 2002/0124882 A1 | | 9/2002 | Russo |
| 2002/0179390 A1 | | 12/2002 | Kitano et al. |
| 2003/0114972 A1 | | 6/2003 | Takafuji et al. |
| 2004/0049331 A1 | * | 3/2004 | Schneider ....................... 701/45 |
| 2005/0100251 A1 | | 5/2005 | Havens et al. |
| 2005/0154530 A1 | | 7/2005 | Hosokawa et al. |
| 2006/0131202 A1 | | 6/2006 | Kramer |
| 2006/0169753 A1 | | 8/2006 | Piucci et al. |
| 2007/0036947 A1 | | 2/2007 | Barwick |
| 2007/0182144 A1 | | 8/2007 | Aranzulla et al. |
| 2007/0205590 A1 | | 9/2007 | Klinkenberger et al. |
| 2008/0083640 A1 | | 4/2008 | Liu |
| 2008/0251332 A1 | | 10/2008 | Stuhmiller et al. |
| 2008/0307553 A1 | | 12/2008 | Jbeili et al. |
| 2010/0004819 A1 | | 1/2010 | Katz et al. |

FOREIGN PATENT DOCUMENTS

| | | |
|---|---|---|
| DE | 19631739 A1 | 2/1998 |
| JP | 2005-262994 A | 9/2005 |

OTHER PUBLICATIONS

Davis, Ph.D., Warren; "What is a Tensor?"; located at www.physlink.com/Education/AskExperts/ae168.cfm; pp. 1-2; printed on Dec. 14, 2004.

Feliciano-Diaz, Xiomara "Geriatric Fall Hip Injury Prevention Device (Personal airbag system to prevent hip fractures on geriatrics)"; NSF Summer Undergraduate Fellowship in Sensor Technologies; located at www.ee.upenn.edu/~sunfest/pastProjects/Papers00/DiazXiomara.pdf, pp. 44-65.

Knight, Will; "Smart Sports Shoe Adapts for Optimal Cushioning"; located at www.newscientist.com/news/print.jsp?id=ns99994969; bearing a date of May 6, 2004; pp. 1; printed on Dec. 7, 2004.

U.S. Appl. No. 12/148,514, Hyde et al.

U.S. Appl. No. 12/454,180, Hyde et al.

"Frequently Asked Questions About Zylon and Body Armor, Written and Distributed by Toyobo Co., Ltd."; Osaka, Japan; 1996-2007; pp. 1-11.

"Meta-Aramid Fiber"; (Jan. 25, 2008).

"Pro Fiber ZYLON®", Toyobo Co., Ltd.; Technical Information (Revised Sep. 2001); Osaka, Japan; bearing a date of Sep. 1, 2001; pp. 1-18.

S. Will; "Investigations by Mehler on the PBO-Fiber Zylon® from Toyobo"; Toyobo Co., Ltd. Mehler R&D, Osaka, Japan; bearing a date of May 7, 2002; pp. 1-5.

"Toyobo Material Safety Data Sheet", Toyobo Co., Ltd.; First issue: Aug. 10, 2000; Revised: Oct. 25, 2000; Material Safety Data Sheet No. F0374K; bearing a date of Oct. 25, 2000; pp. 1-3.

Nagourney, Eric; "Aging: Hip Protectors Don't Help Prevent Fractures in Falls"; The New York Times; bearing a date of Aug. 7, 2007; p. 1; The New York Times Company; printed on Aug. 9, 2007.

* cited by examiner

FIG. 20

Apparatus 2000

2010 At least two actuatable cushioning elements configured to provide cushioning support for an object, the at least two actuatable cushioning elements including:

2012 A first subset of actuatable cushioning elements enabled to actuate in response to an event during a first time period.

2014 A second subset of actuatable cushioning elements enabled to actuate in response to an event during a second time period.

FIG. 21

Apparatus 2000

2010 At least two actuatable cushioning elements configured to provide cushioning support for an object, the at least two actuatable cushioning elements including:

2102 One or more actuatable cushioning elements that are two-point-five (2.5) centimeters in width or less in an unexpanded state.

2104 One or more actuatable cushioning elements that are five (5) centimeters in width or less in an unexpanded state.

2106 One or more actuatable cushioning elements that are eight (8) centimeters in width or less in an unexpanded state.

2012 A first subset of actuatable cushioning elements enabled to actuate in response to an event during a first time period.

2014 A second subset of actuatable cushioning elements enabled to actuate in response to an event during a second time period.

FIG. 22A

Apparatus

2010 At least two actuatable cushioning elements configured to provide cushioning support for an object, the at least two actuatable cushioning elements including:

2202 At least twelve (12) actuatable cushioning elements.

2204 At least twenty (20) actuatable cushioning elements.

2206 At least fifty (50) actuatable cushioning elements.

2208 At least one hundred (100) actuatable cushioning elements.

2209 At least five hundred (500) actuatable cushioning elements.

2210 At least one inflatable gas bag.

2012 A first subset of actuatable cushioning elements enabled to actuate in response to an event during a first time period.

2014 A second subset of actuatable cushioning elements enabled to actuate in response to an event during a second time period.

FIG. 22B

Key To
FIG.22

| 22A | 22B |

Apparatus

2010 At least two actuatable cushioning elements configured to provide cushioning support for an object, the at least two actuatable cushioning elements including:

2212 Wherein the at least two actuatable cushioning elements comprise: at least one actuatable cushioning element of an expandable cushioning material.

2214 Wherein the at least two actuatable cushioning elements comprise: a plurality of actuatable portions of an expandable cushioning material.

2216 Wherein the at least two actuatable cushioning elements comprise:

2217 At least two re-usable actuatable cushioning elements.

2219 At least two disposable actuatable cushioning elements.

2012 A first subset of actuatable cushioning elements enabled to actuate in response to an event during a first time period.

2014 A second subset of actuatable cushioning elements enabled to actuate in response to an event during a second time period.

ACTUATABLE CUSHIONING ELEMENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/136,339 entitled Wearable/Portable Protection for A Body, naming Muriel Y. Ishikawa, Edward K. Y. Jung, Cameron A. Myhrvold, Conor L. Myhrvold, Nathan P. Myhrvold, Lowell L. Wood, Jr. and Victoria Y. H. Wood, as inventors, filed May 24, 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/603,965, entitled ACTUATABLE CUSHIONING ELEMENTS, naming Roderick A. Hyde; Edward K.Y. Jung; Royce A. Levien; Robert W. Lord; Mark A. Malamud; John D. Rinaldo, Jr.; and Lowell L. Wood, Jr. as inventors, filed 21 Nov. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http:///www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent that such subject matter is not inconsistent herewith.

SUMMARY

An embodiment provides a method. In one implementation, the method includes but is not limited to enabling a first subset of actuatable cushioning elements for a first time period, enabling a second subset of actuatable cushioning elements for a second time period, determining an event, and actuating, based on a time the event is determined, at least one of the first subset of actuatable cushioning elements or the second subset of actuatable cushioning elements to provide cushioning support for an object. In addition to the foregoing, other method aspects are described in the claims, drawings, and text forming a part of the present disclosure.

An embodiment provides a method. In one implementation, the method includes but is not limited to determining an event, establishing a communication between two or more actuatable cushioning elements, and actuating a subset of the two or more actuatable cushioning elements in response to the communication between the two or more actuatable cushioning elements. In addition to the foregoing, other method aspects are described in the claims, drawings, and text forming a part of the present disclosure.

An embodiment provides a method. In one implementation, the method includes but is not limited to determining an event, and actuating a subset of two or more actuatable cushioning elements based on a random or pseudo-random function to provide cushioning support for an object. In addition to the foregoing, other method aspects are described in the claims, drawings, and text forming a part of the present disclosure.

An embodiment provides a method. In one implementation, the method includes but is not limited to determining an event, and actuating, based on the determining an event, a subset from 12 or more actuatable cushioning elements to provide cushioning support for an object. In addition to the foregoing, other method aspects are described in the claims, drawings, and text forming a part of the present disclosure.

An embodiment provides an apparatus. In one implementation, the apparatus includes but is not limited to at least two actuatable cushioning elements configured to provide cushioning support for an object, the actuatable cushioning elements including a first subset of actuatable cushioning elements enabled to actuate in response to an event during a first time period, and a second subset of actuatable cushioning elements enabled to actuate in response to an event during a second time period. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements adapted for communication. The apparatus is configured to determine an event, and actuate, based upon communication between two or more of the actuatable cushioning elements, a subset of the actuatable cushioning elements in response to determining the event to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least twelve actuatable cushioning elements. The apparatus is configured to determine an event, and actuate, based on the event, a subset of the actuatable cushioning elements to provide cushioning support for an object. In addition to the foregoing, other apparatus aspects are described in the claims, drawings, and text forming a part of the present disclosure.

An embodiment provides an apparatus. In one implementation, the apparatus includes but is not limited to at least two actuatable cushioning elements. The apparatus is configured to determine an event, and actuate a subset of two or more actuatable cushioning elements based on a random or pseudo-random function to provide cushioning support for an object. In addition to the foregoing, other apparatus aspects are described in the claims, drawings, and text forming a part of the present disclosure.

An embodiment provides a computer program product. In one implementation, the computer program product includes but is not limited to a signal bearing medium bearing one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset of actuatable cushioning elements or the second subset of actuatable cushioning elements to provide cushioning support for an object. In addition to the foregoing, other computer program product aspects are described in the claims, drawings, and text forming a part of the present disclosure.

BRIEF DESCRIPTION OF THE DRAWINGS

FIG. 20 illustrates an example apparatus in which embodiments may be implemented.

FIG. 21 illustrates an alternative embodiment of the example apparatus of FIG. 20.

FIG. 22 illustrates an alternative embodiment of the example apparatus of FIG. 20.

The use of the same symbols in different drawings typically indicates similar or identical items.

DETAILED DESCRIPTION

Figure 1:
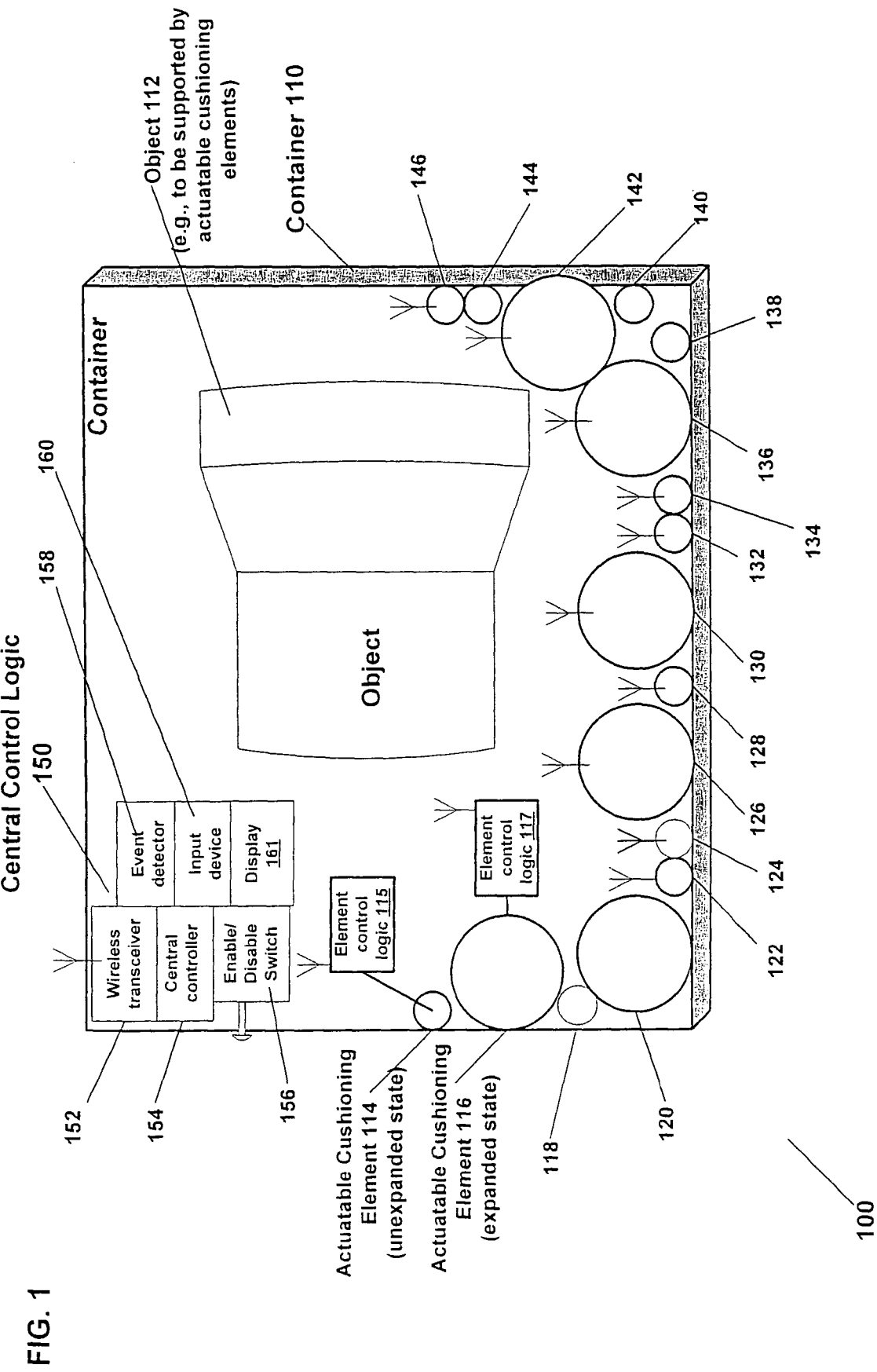
FIG. 1 illustrates an example system in which embodiments may be implemented.

FIG. 1 illustrates an example system 100 in which embodiments may be implemented. System 100 may include, for example, a container 110, which may be any type of container, such as a box, a container for shipping cargo on a vehicle, boat, plane, train or other vehicle, a container for shipping or storing small or large items, a container for shipping fragile items, or any other container. Container 110 may be made from any suitable material, such as cardboard, plastic, steel, etc., as a few example materials, but any type of material may be used.

System 100 may also include one or more actuatable cushioning elements provided within container 110, such as actuatable cushioning elements 114, 116, 118, 120, 122, 124, 126, 128, 130, 132, 134, 136, 138, 140, 142, 144, 146, etc. The actuatable cushioning elements may provide cushioning support for an item or object, such as object 112, for example. Object 112 may be any type of object, such as electronics, books, food items, cargo, fragile or delicate or breakable items which may be in need of cushioning support, people, animals, other organisms, or any other type of object. These are just a few examples of an object which may be supported by actuatable cushioning elements, and the various embodiments are not limited thereto. Actuatable cushioning elements 114, 116, etc. may spread a force or interaction of an object over a period of time or over an area within container 110, which may, at least in some cases, decrease potential impact and/or damage to the object, for example.

For example, one or more actuatable cushioning elements may be actuated (e.g., expanded) in response to an event to protect an object or passenger from damage or harm or collision effects. Also, for example, one or more actuatable cushioning elements may be actuated based upon one or more sensed values in accordance with a model of one or more objects to be protected, the actuatable cushioning elements, and the environment. Also, for example, one or more actuatable cushioning elements may be actuated over a series of events or in response to a series of events to provide a coordinated protection of one or more objects or passengers in a vehicle from harm, damage or other effects from a collision, acceleration or other event. The protection of one or more objects may be based upon a harm function of the actual or predicted damage to subsets or portions of such objects, such as a maximum value, a weighted value, a cumulative value, or other such functions. The harm function may include damage to the environment (e.g., pedestrians or other vehicles in a vehicular collision, higher valued objects in the vicinity of a container collision, etc.) as well as to the one or more nominally protected objects. These are merely a few illustrative examples and the disclosure is not limited thereto. Additional details and example embodiments are described herein.

Actuatable cushioning elements 114, 116, etc. may be in either an expanded state, such as shown for actuatable cushioning element 116, or an unexpanded state such as for actuatable cushioning element 114, for example. Or an actuatable cushioning element may also be partially expanded or partially unexpanded, for example.

In an example embodiment, some types of actuatable cushioning elements may be provided in an expanded state (e.g., inflated) for a limited period of time. For example, one or more actuatable cushioning elements may be actuated (e.g., expanded or unexpanded) in response to an event. In an example embodiment, a subset of actuatable cushioning elements may be actuated in response to an event. In another example embodiment, one or more actuatable cushioning elements may be expanded just prior to shipment and may remain in an expanded state for an extended period of time, or for a duration of transport, for example. In an example embodiment, an actuatable cushioning element may provide greater cushioning support for an object while in an expanded state, as compared to an unexpanded state (e.g., due to a greater volume of flexible or cushioning material or matter to absorb an impact). This is merely an example embodiment, and the disclosure is not limited thereto.

One or more of the actuatable cushioning elements may be actuated, which may include putting an actuatable cushioning element into motion or action. Actuation may include, for example, expanding an actuatable cushioning element from an unexpanded state to an expanded state (e.g., causing an element to expand or increase in size), or unexpanding an actuatable cushioning element from an expanded state to an unexpanded state (e.g., causing an element to shrink or reduce in size or contract), as examples. Actuation may include, for example, causing an airbag or other entity to inflate or deflate. Actuation may include, for example, changing or controlling the shape of an actuatable cushioning element. Actuation may also include partial motions or partial actions, such as partially expanding or partially unexpanding an actuatable cushioning element, for example.

Actuatable cushioning elements 114, 116, etc. may include any type of expandable element. For example, actuatable cushioning elements 114, 116, etc., may include expandable gas bags which may expand based on the application of pressurized gas to the bag similar to the airbags used in automobiles and other vehicles. Actuatable cushioning elements 114, 116, etc. may alternatively include a fluid-expandable bag or entity that may be expanded by fluid. For example, actuatable cushioning elements 114, 116, etc., may include fluid-actuatable elements, where fluid may be sourced from one or more fluid reservoirs, e.g., via a valving actuation. The fluid reservoirs may, for example, cause the fluid actuatable elements to actuate (e.g., expand and/or unexpand/contract) by causing fluid to flow into or out of the fluid-actuatable elements. For example, actuatable cushioning elements 114, 116, etc., may include magnetic field-actuatable elements, where magnetic field may be sourced from one or more electric energy sources, e.g., via a capacitor, an inductor, a flux generator, or other means. The electric energy sources may, for example, cause the magnetic field actuatable elements to actuate (e.g., expand and/or unexpand/contract) by causing magnetic fields to apply force to the fluid-actuatable elements. Actuatable cushioning elements 114, 116, etc. alternatively may include an expandable cushioning material which may expand (or unexpand), for example, through the application of a chemical, gas, liquid, electrical energy, reaction force or other energy or material. Electrical energy may, for example be used to expand (or unexpand) or shape an expandable cushioning material by means of an electric motor, a linear electromagnetic motor, a piezoelectric actuator, or other means. Reaction force may, for example be used to expand (or unexpand) or shape an expandable cushioning material by means of a rocket engine, a pulsed microimpulse reaction engine, a magnetic repulsion coil, or other means. Expandable cushioning material may apply cushioning force by means of pressure, electric/magnetic fields, inertia, compressive stress, tensile force, or shear force, or a combination thereof. Expandable cushioning material may apply cushioning force and/or dissipate interaction energy by means of crushing (e.g., foam or shells), breaking (e.g., fibers or wires), buckling (e.g., struts or plates) or other mechanisms.

In an example embodiment, the actuatable cushioning elements may be re-usable, where the cushioning elements may be expanded to absorb an impact, later fully or partially unexpanded, and then subsequently expanded again to provide cushioning support or protect the object for a second event or impact, or to provide cushioning support in another container, for example. While in another example embodiment, the actuatable cushioning elements may be disposable, wherein the elements, for example, may be expanded or used only once or only a few times.

Any number of actuatable cushioning elements may be used to provide cushioning support for object 112. For example, in one embodiment, at least 12 actuatable cushioning elements may be used to provide cushioning support for an object. This may include providing at least 12, 20, 50, 100 or even 500 actuatable cushioning elements (or more) to provide cushioning support, according to different example embodiments.

The actuatable cushioning elements may be any shape (e.g., round, oblong, rectangular, irregular shape) and any size. In an example embodiment, one or more of actuatable cushioning elements 114, 116, etc. may be 2.5 cm in width or less in an unexpanded state, or may be 2.5 cm in width or more in an unexpanded state, or may be 5 cm or less in an unexpanded state, or may be 8 cm or less in an unexpanded state, as examples. For example, different numbers and/or sizes of cushioning elements may be used, e.g., depending on the application, the type of object to be protected, the type or size of container to be used, or other factors. These are some example numbers and sizes and the disclosure is not limited thereto. In an example embodiment, smaller-sized actuatable cushioning elements may be more applicable for smaller containers, whereas larger actuatable cushioning elements may be more applicable for larger containers, for example.

In another example embodiment, a group of actuatable cushioning elements may be provided within a container, or outside of the container, to provide cushioning support for an object, such as a vase or other object within the container. A first subset of actuatable cushioning elements may be pre-inflated or pre-expanded in response to a first event, e.g., at packing time or just prior to shipment. At some later point, a second subset of actuatable cushioning elements may be actuated (e.g., expanded), in response to a second event (such as an acceleration that exceeds a threshold, or an impact or likely impact), for example. At some point later, a third subset of actuatable cushioning elements may be actuated (e.g., inflated or expanded), in response to a third event, for example. Also, in an example embodiment, upon arrival (which may be considered a fourth event), one or more (or even all) of the actuatable cushioning elements in the container may be actuated (e.g., unexpanded or deflated), to allow the object to be unpacked from the container. The actuatable cushioning elements may also be-reused in another container, for example. In this manner, the group of actuatable cushioning elements may provide cushioning support for an object, e.g., for one or more events.

Actuatable cushioning elements may be actuated outside of a container or outside of the preactivation envelope of a system. For example, such actuation may provide additional cushioning to that provided with interior actuatable cushioning elements alone. For example, such exterior actuation may also act by modification of the dynamics of the interaction with the environment, such as by introducing sliding contacts, aerodynamic lift, sideways steering forces, or by other means. For example, such exterior actuatable cushioning elements may have spherical shapes, cylindrical shapes, high aspect ratio shapes, lifting-body shapes, or other shapes. For example, exterior actuatable cushioning elements may include expandable gas bags, fluid actuatable elements, expandable cushioning materials, skids, reaction engines, drag-inducing devices, anchors, or other such elements. For example, such exterior actuatable cushioning elements may act in a time dependent (e.g., via a specified actuation profile, by stretching, deforming, breaking) and/or time sequenced manner (e.g., by timed activation of one or more exterior actuatable cushioning elements).

According to an example embodiment, one or more actuatable cushioning elements may be actuated (e.g., expanded or unexpanded) for or in response to an event. The event may be any of a variety of different events. For example, the event may include determining an impact or likely impact, determining an acceleration or change in acceleration that exceeds a threshold (such as when a container has been dropped), determining a temperature (e.g., inside or outside the container) that reaches a selected temperature, determining a time that reaches a specific time, determining that a location has been reached or that a selected distance within the location has been reached (e.g., either approaching or leaving the location), determining that a selected subset of actuatable cushioning elements (e.g., some or all of the elements) have not yet been expanded (thus more elements should be expanded to provide support), or other event. These are merely a few examples of events, e.g., events which may cause or result in one or more actuatable cushioning elements to be actuated.

According to an example embodiment, acceleration may include a scalar quantity, or may include a vector quantity. Acceleration may include linear acceleration, angular acceleration, or other type of acceleration. A detected or determined acceleration may include an acceleration having components with varying degrees of interest or relevance (e.g., one or more linear components may be used, or one or more angular components to indicate an event or events to trigger actuation of an actuatable cushioning element). For example, an event may include an acceleration or change in acceleration that may include an acceleration (e.g., one or more acceleration components) or a change in acceleration that may exceed a threshold. Alternatively, the acceleration may be determined in more complex manners, such as ad hoc, time and situation-dependent manners, or other manners. For example, a model may be provided or used to model the operation of a system (e.g., system 100), or model the operation of actuatable cushioning elements, or model the free-fall or acceleration or movement of one or more objects or passengers, or the like. For example, one or more actuatable cushioning elements may be actuated (e.g., expanded or unexpanded/contracted) based on the model and/or based on determination of one or more events. For example, the selected actuation of one or more actuatable cushioning elements may be based upon the predicted shift of the time profile of one or more accelerations from a value associated with one actuation state to another value corresponding to the selected actuation state, the value of which is predicted to reduce damage to one or more protected objects. For example, measured and model-forecasted time-integrals of acceleration that may exceed case dependent thresholds may be used, e.g., to identify criteria or likely situations where objects may be damaged or broken. In another example embodiment, a time-history of acceleration may, in some cases, may inform the system 100 as to the level of protection that may or should be used to protect the object. For example, an extended time-interval of free-fall may result in decelerations of significant magnitudes being purposefully applied to protect objects when, e.g., an event is detected. For example, measured or model-forecasted stresses within the object may be used, e.g., to identify criteria or likely situations where objects may be damaged or broken. Such stress thresholds may include peak values or time-dependent value profiles of a function of one or more elements of the stress tensor, or may include initiation or propagation of fracture. For example, measured or model-forecasted temperatures within the object may be used, e.g., to identify, criteria or likely situations where objects may be damaged or broken. Such temperature thresholds may include peak temperature values, or energy deposition values (e.g., a substance that will undergo a phase change—e.g., liquid to gas—after accumulation of a certain energy, which those skilled in the art will appreciate is an example of a more general determination that an energy exceeds a threshold), or time dependent temperature profiles. These are merely a few additional example embodiments relating to acceleration, and the disclosure is not limited thereto.

Referring to FIG. 1 again, in an example embodiment, system 100 may include central control logic 150, including a central controller 154 which may provide overall control for system 100. Central control logic 150 may include a number of additional blocks coupled to central controller 154, which will be briefly described.

A wireless receiver 152 may transmit and receive wireless signals such as RF (radio frequency) signals. Wireless signals such as RF signals may include any wireless or other electromagnetic signals, and are not limited to any particular frequency range.

An event detector 158 may detect or determine an event (or condition), or a series of events, such as an acceleration or change in acceleration that exceeds a threshold, a temperature that reaches a specific temperature, a location that is within a specific distance of a selected location, or any other event. Event detector 158 may include any type of detector or sensor. Event detector 158 may, for example, include any well-known detector, instrument or device to detect an event or condition. For example, a thermometer may detect a temperature. A GPS (Global Positioning System) receiver may determine that a specific location has been reached. An accelerometer may determine that an acceleration or change in acceleration has exceeded a threshold. In another example embodiment, event detector 158 may include a Micro Electro Mechanical System (MEMS) accelerometer, which may, for instance, sense a displacement of a micro-cantilevered beam under acceleration transverse to its displacement-direction, e.g., by capacitive means. An angular accelerometer may determine that an angular acceleration or change in angular acceleration has exceeded a threshold. In another example embodiment, event detector 158 may include a Ring Laser Gyro, a Fiber Optic Gyro, a Vibrating Structure Gyro, a MEMS Gyro, or a mechanical gyroscope.

Or, alternatively for event detector 158, electrodes may be placed on a suitably shaped and mounted piezoelectric material for sensing a current and/or voltage generated by the piezoelectric material deforming in response to acceleration induced stress. Some examples of materials that may be used in the piezoelectric version of the event detector 158 may include lead zirconate titanate (PZT), lead zincate niobate (PZN), lead zincate niobate lead-titanate (PZN-PT), lead magnesium niobate lead-titanate (PMN-PT), lead lanthanum zirconate titanate (PLZT), Nb/Ta doped PLZT, and Barium zirconate titanate (BZT). These are just a few examples of event detectors.

An enable/disable switch 156 may be used to enable or disable system 100. For example, enable/disable switch 156 may be used to enable the one or more actuatable cushioning elements to be actuated, or may disable the one or more actuatable cushioning elements from being actuated, for example. System 100 may also include an input device, such as a mouse, keypad or other input device, which may allow a user to configure operation of system 100, for example. For example, enable/disable switch 156 and/or input device 160 may enable a first subset of actuatable cushioning elements to be actuatable during a first time period (or first time interval), and may enable a second subset of actuatable cushioning elements to be actuatable during a second time period (or second time interval), e.g., to provide cushioning support for an object over (or for) a series of events. The phrase "time period" may, for example, include any time interval, and is not necessarily cyclical or periodic, and may include random, non-periodic and/or non-cyclical time periods or time intervals, as examples.

An output device or display 161 may also be provided to display information. Input device 160 and display 161 may be provided in a position which may be reached or accessed by a user, such as on the outside of the container 110, for example.

One or more of the actuatable cushioning elements may include an element control logic to control overall operation and/or actuation of the element(s) to which the control logic is connected. For example, element control logic 115 may provide control to actuatable cushioning element 114, while element control logic 117 may control operation of actuatable cushioning element 116.

An element control logic may control a single actuatable cushioning element, or may control multiple cushioning elements, for example. The element control logic for one or more actuatable cushioning elements may communicate with other element control logic to provide a cushioning support for object 112 in a coordinated manner, for example. According to an example embodiment, this may include an element control logic transmitting a wireless signal(s) when the associated actuatable cushioning element has been actuated (or otherwise an element control logic for an element transmitting a signal notifying other elements of the cushioning element's state) which may allow the element control logic associated with other actuatable cushioning elements to determine how many or what percentage of cushioning elements are in an expanded state. For example, if an insufficient number of cushioning elements are currently in an expanded state, then one or more actuatable cushioning elements (via their element control logic) may then actuate or move to an expanded state to improve cushioning support for the object. Thus, distributed control may be provided via communication between the element control logic for different actuatable cushioning elements.

In another example embodiment, central controller 154 (FIG. 1) of central control logic 150 may provide central control for operation of the one or more actuatable cushioning elements within container 110. For example, event detector 158 may detect an event, and then wireless transceiver 152 (e.g., under control of central controller 154) may transmit wireless signals to one or more element control logic (e.g., 115, 117, . . . ) to cause one or more actuatable cushioning elements to actuate in response to the event.

Figure 2:
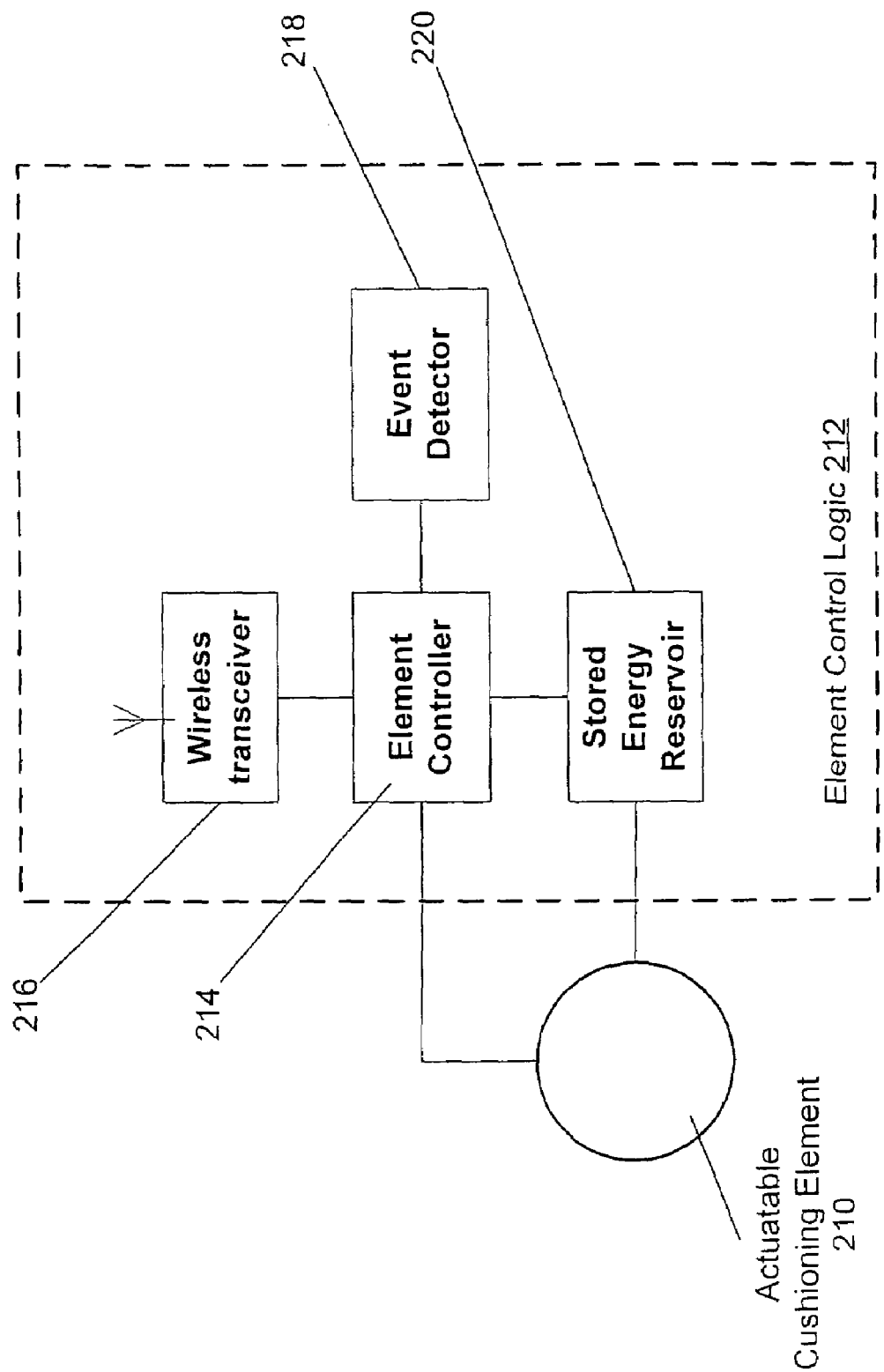
FIG. 2 illustrates an actuatable cushioning element according to an example embodiment.

FIG. 2 illustrates an actuatable cushioning element according to an example embodiment. An actuatable cushioning element 210 may be coupled to (or may include) an associated element control logic 212. Although not shown, one or more of the actuatable cushioning elements (e.g., actuatable cushioning elements 114, 116, 118, 120, 122, 124, . . . ) may each include a similar element control logic. For example, element control logic 115 and 117 may be the same as or similar to element control logic 212, for example. In an alternative embodiment, element control logic 212 may be omitted.

Element control logic 212 may include an element controller 214 to provide overall control for an actuatable cushioning element 210. An event detector 218 may detect or determine an event. A wireless transceiver 216 may transmit and receive wireless signals. Alternatively, actuatable cushioning elements may be coupled together (and/or to central control logic 150) via any communications media, such as a wireless media (e.g., via RF or other electromagnetic signals, acoustic signals), a wired communication media, such as cable, wire, fiber optic line, etc., or other media.

A stored energy reservoir 220 may store gas, liquid, energy (chemical or electrical energy or the like) or other energy or substance, which may be used to actuate actuatable cushioning element 210. For example, stored energy reservoir 220 may receive signals from element controller 214, causing stored energy reservoir 220 to release pressurized liquid or gas to actuatable cushioning element 210 to cause element 210 to expand or inflate, or may release a chemical or other substance causing an expandable cushioning material to expand, for example. In an example embodiment, actuatable cushioning element 210 may include one or more fluid-actuatable elements, where fluid may be sourced from one or more fluid reservoirs (such as from stored energy reservoir 220), e.g., via a valving actuation. The fluid reservoirs may, for example, cause the fluid actuatable element(s) to actuate (e.g., expand and/or unexpand/contract) by causing fluid to flow into or out of the fluid-actuatable elements.

One or more actuatable cushioning elements, such as actuatable cushioning element 210, may be coupled to an element controller (e.g., element controller 214) via any communications media, such as a wireless media (e.g., via RF or other electromagnetic signals, acoustic signals), a wired communication media, such as cable, wire, fiber optic line, etc., or other communications media.

According to an example embodiment, one or more actuatable cushioning elements may include fluid-actuated cushioning elements or structures, or may include gas-actuated or gas-powered cushioning elements, or other types of elements. For example, one or more of the actuatable cushioning elements, when actuated, may have at least one of a size, shape, position, orientation, stress-strain tensor components (or other component) of the cushioning elements changed or modified as a result of one or more actuating actions applied to the cushioning element. For example, an actuating action or sequence of actuating actions which may be applied to an actuatable cushioning element, may, e.g., first change its position (or center of mass), then its orientation, then its size, and/or its rigidity or other characteristic. These changes to the actuatable cushioning element may occur, e.g., in a pre-programmed manner, and may occur, e.g., in response to or based upon an event, such as based on a measurement, signals received from cooperating cushioning elements or a controller(s) in the system 100, or other signals or criteria or event. The signals that may be received from other cooperating structures (e.g., elements or controllers) may, for example, describe or indicate their own characteristics, such as size, pressure, orientation, shape, etc. A model (e.g., of the system or operation of the system or objects) may be used to determine one or more actions that may be performed (such as actuation of an element), e.g., to protect one or more objects or passengers from harm or damage.

Also, in another example embodiment, one or more objects or passengers may include one or more associated actuatable cushioning elements on or near each object or passenger, where the group of associated actuatable cushioning elements may be independently controlled so as to provide cushioning support and/or protection for the associated object or passenger. Also, in another example embodiment, two or more separate objects, each protected by their own sets of actuatable cushioning elements may interact (for instance, by an actual or predicted collision). The actuation of one or more object's actuatable cushioning elements may occur with or without cooperation from that of the actuatable cushioning elements of one or more of the other objects. For example, one or more of the objects may sense the actions or state of the actuatable cushioning elements associated with one or more of the other objects. For example, two or more of the objects may share information on the actual and/or planned actuation histories of their actuatable cushioning elements. For example, one or more of the objects may sense the actions or state of the actuatable cushioning elements associated with one or more of the other objects. For example, one or more objects may base the actuation of one or more of its actuatable cushioning elements upon the sensed or predicted actions of one or more actuatable cushioning elements associated with one or more of the other objects. For example, one or more objects may command the actuation or nonactuation of one or more actuatable cushioning elements associated with one or more of the other objects. This commanded actuation process may be performed by a joint decision process, by a hierarchical process, by a master-slave process, or by other means.

Figure 3:
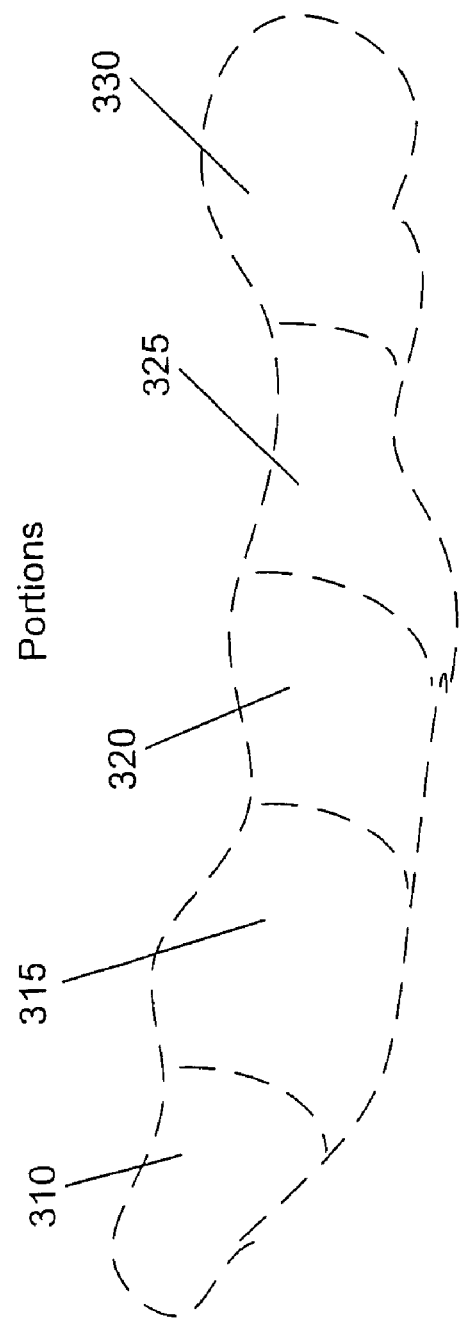
FIG. 3 illustrates actuatable cushioning elements according to another example embodiment.

FIG. 3 illustrates actuatable cushioning elements according to another example embodiment. An expandable cushioning material 305 is shown in FIG. 3. A separate portion of the expandable cushioning material 305, such as portions 310, 315, 320, 325, and 330, may be actuated (expanded or unexpanded). Thus, actuatable cushioning elements may be provided as portions of the expandable cushioning material 305, for example. In an example embodiment, the portions may be actuated by application of a gas, liquid or other substance or energy applied to the portion, for example.

Figure 4:
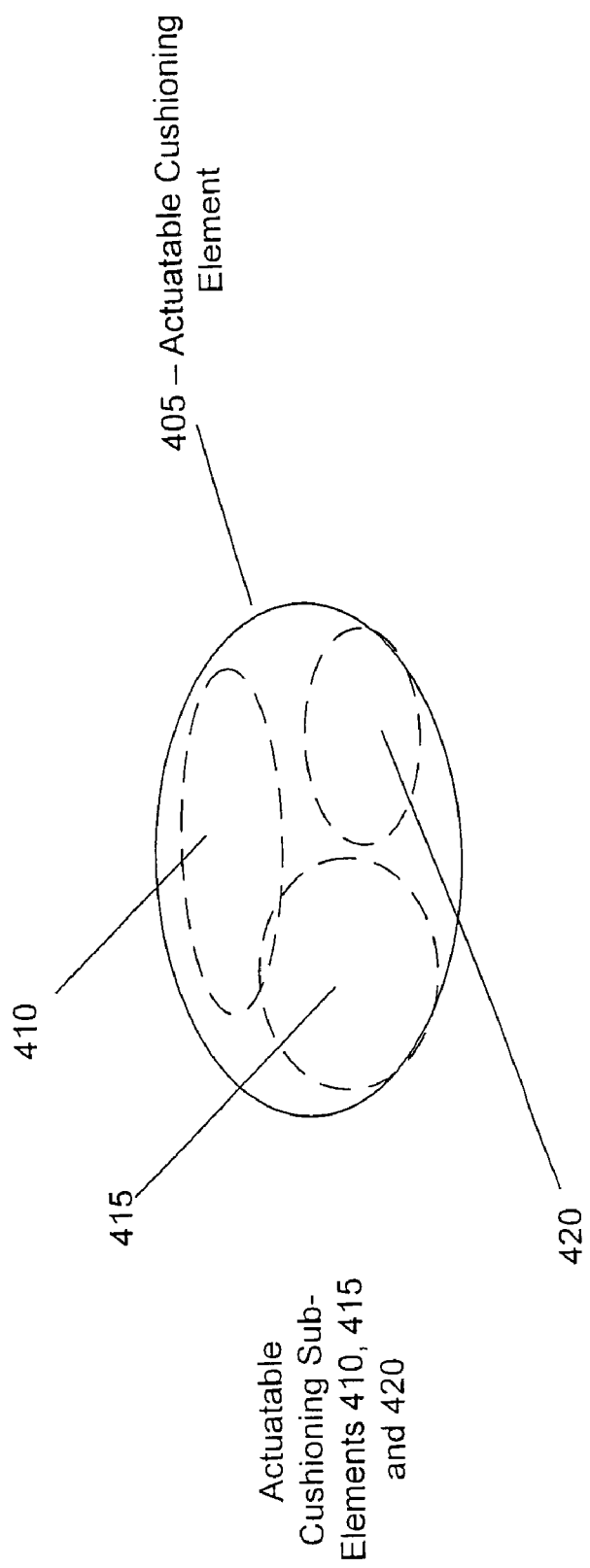
FIG. 4 illustrates actuatable cushioning elements according to yet another example embodiment.

FIG. 4 illustrates actuatable cushioning elements according to yet another example embodiment. According to an example embodiment, an actuatable cushioning element 405 may include one or more sub-elements, such as sub-elements 410, 415 and 420. For example, each of these sub-elements may be separately controlled, or may be separately actuated, e.g., under control of an element control logic, for example.

Figure 5:
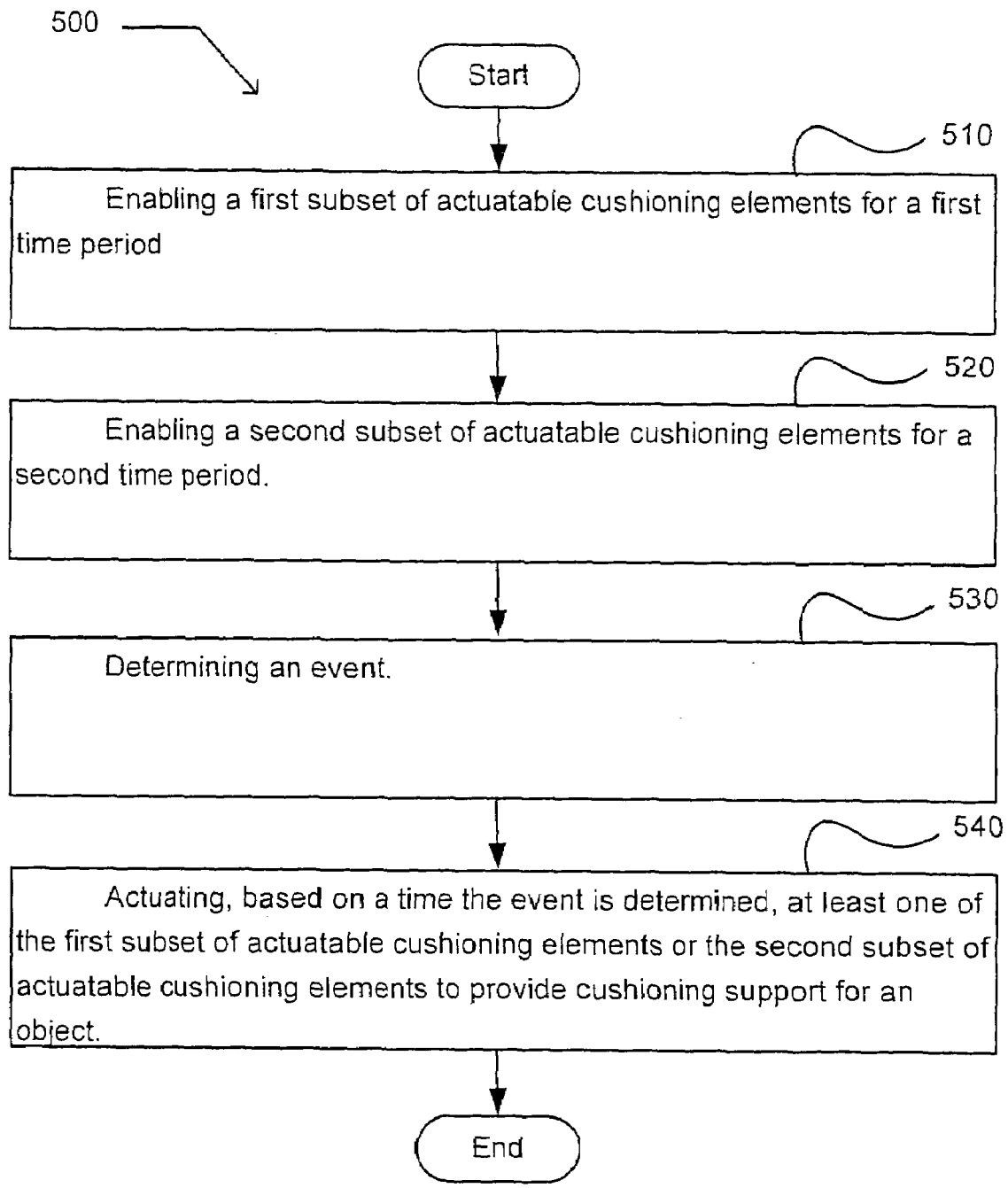
FIG. 5 illustrates an operational flow representing example operations related to actuatable cushioning elements according to an example embodiment.

FIG. 5 illustrates an operational flow 500 representing example operations related to actuatable cushioning elements. In FIG. 5 and in following figures that include various examples of operational flows, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. Also, although the various operational flows are presented in the sequence(s) illustrated, it should be understood that the various operations may be performed in other orders than those which are illustrated, or may be performed concurrently.

After a start operation, the operational flow 500 moves to an enabling operation 510 where a first subset of actuatable cushioning elements are enabled for a first time period. For example, as shown in FIG. 1, enable/disable switch 156 and/or input device 160 may enable a first subset of actuatable cushioning elements to actuate during a first five minutes after container 110 has departed.

Then, in an enabling operation 520, a second subset of actuatable cushioning elements is enabled during a second time period. For example, as shown in FIG. 1, enable/disable switch 156 and/or input device 160 may enable a second subset of actuatable cushioning elements to actuate during a second five minutes after container 110 has departed. In this manner, for example, different subsets of cushioning elements may be enabled to actuate in response to an event. This may allow, for example, the system 100 to provide cushioning support for an object over one or more or a series of events.

Then in determining operation 530, an event is determined. For example, event detector 218 in FIG. 2 for an actuatable cushioning element may (e.g., as an accelerometer) determine that an acceleration or change in acceleration has exceeded a threshold, or may determine (e.g., as a GPS receiver) that a location has been reached or that a specific distance within a location has been reached.

Then in actuating operation 540, at least one of the first subset of actuatable cushioning elements or the second subset of actuatable cushioning elements are actuated based on a time the event is determined to provide cushioning support for an object. For example, a first subset of elements may include elements 114, 118 and 122, for example, which may be enabled during a first five minutes. In response to detecting an event during a first five minutes, for example, the element control logic 212 (FIG. 2) associated with one or more of actuatable cushioning elements 114, 118 and 122, may cause these actuatable cushioning elements to expand (e.g., based on pressurized gas or liquid or other material or energy released from stored energy reservoir 220 for each element). Alternatively, central controller 154 may actuate one of the subsets of actuatable cushioning elements.

Figure 6:
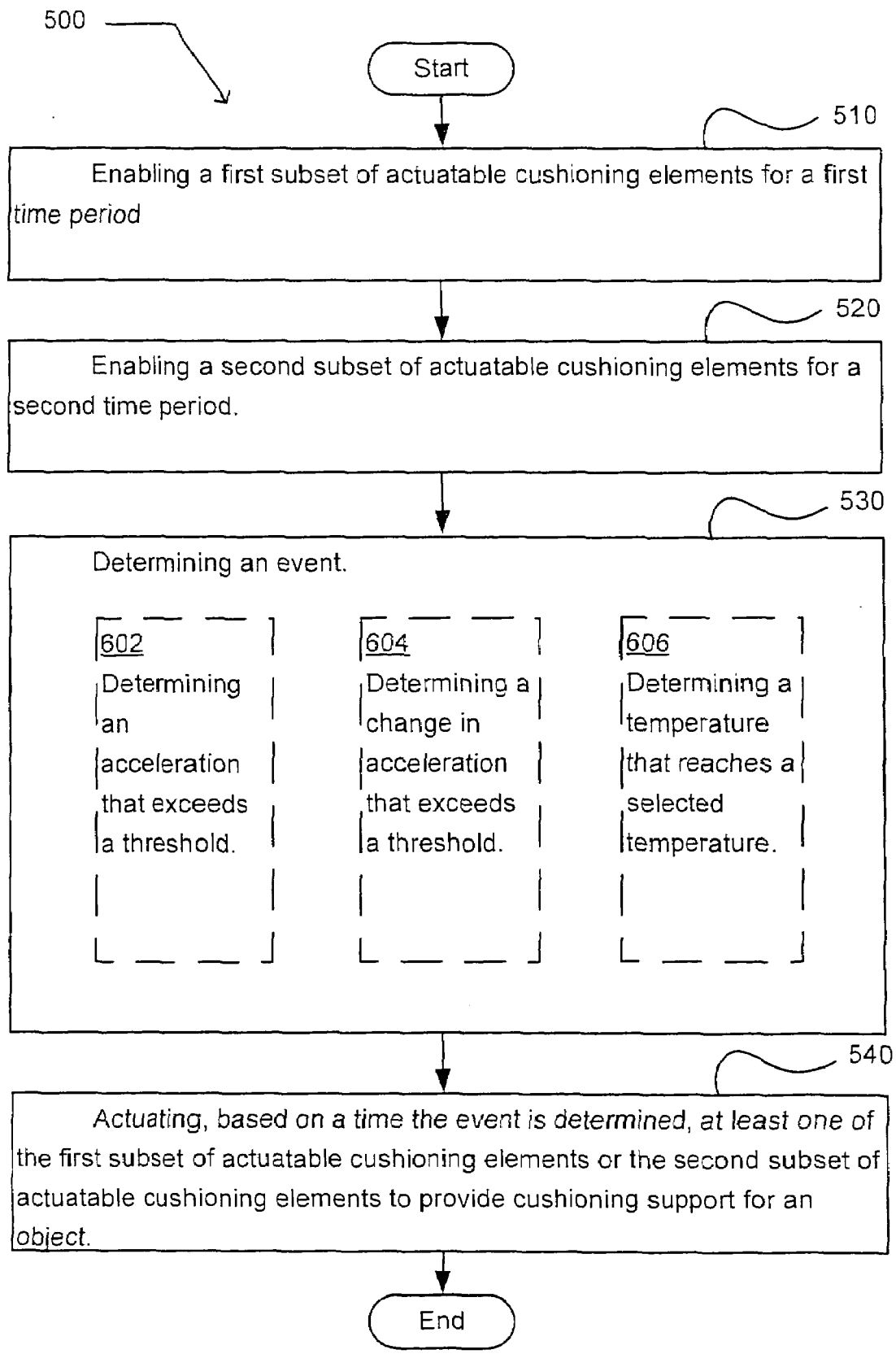
FIG. 6 illustrates an alternative embodiment of the example operational flow of FIG. 5.

FIG. 6 illustrates alternative embodiments of the example operational flow 500 of FIG. 5. FIG. 6 illustrates example embodiments where the determining operation 530 may include at least one additional operation. Additional operations may include operations 602, 604 and/or 606.

At the operation 602 an acceleration that exceeds a threshold is determined. For example, event detector 218 (e.g., as an accelerometer) in FIG. 2, may determine that an acceleration has exceeded a threshold, such as 0.2 G ("point two" G), where G indicates a force of gravity. When acceleration exceeds a threshold, this may indicate or suggest that a collision for the container 110 is likely, or that the container is in free fall or has been dropped, or other condition which may be damaging to the object inside the container 110. Thus, in such case, it may be desirable to increase cushioning support for the object, e.g., by actuating or expanding additional cushioning elements.

At the operation 604, a change in acceleration that exceeds a threshold is determined. For example, event detector 218 in FIG. 2 may determine that acceleration has increased from 0 G to 0.1 G ("point one" G) within a specific period of time, e.g., which may indicate a likely collision for the container.

At the operation 606 a temperature that reaches a selected temperature is determined. For example, event detector 218 (FIG. 2), e.g., as a thermometer, may determine that a temperature within the container has reached a temperature above freezing, and therefore, additional cushioning support should be provided for the perishable or frozen food items or a fragile object in the container.

Figure 7:
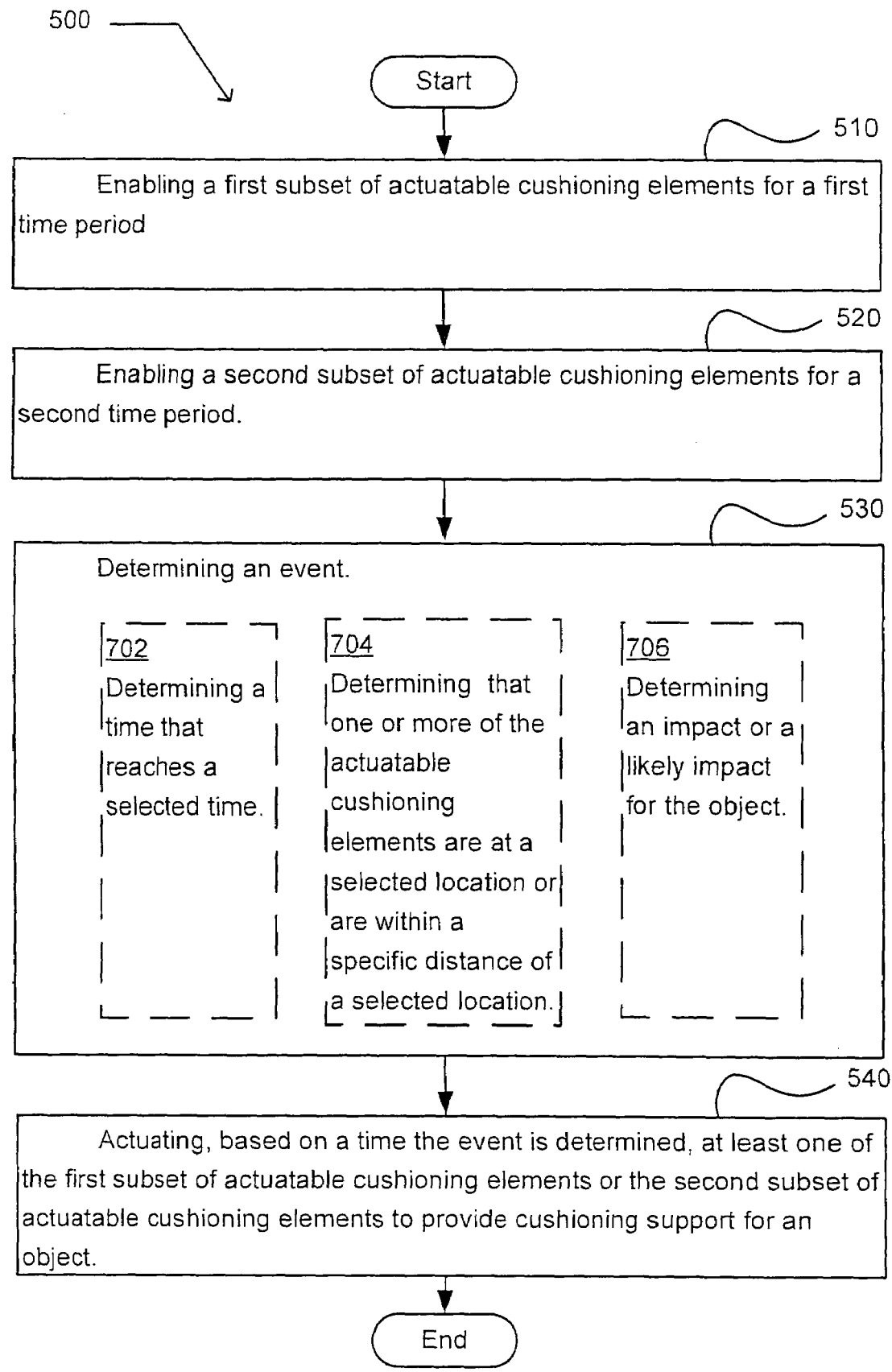
FIG. 7 illustrates an alternative embodiment of the example operational flow of FIG. 5.

FIG. 7 illustrates alternative embodiments of the example operational flow 500 of FIG. 5. FIG. 7 illustrates example embodiments where the determining operation 530 may include at least one additional operation. Additional operations may include operations 702, 704 or 706.

At the operation 702, a time that reaches a selected time is determined. For example, event detector 218 (FIG. 2) may determine that the time is now 12 noon. This time may indicate that additional cushioning support should be provided for the object, for example.

At the operation 704, it is determined that one or more of the actuatable cushioning elements are at a selected location or are within a specific distance of a selected location. For example, event detector 218, e.g., as a GPS receiver, may determine that packages of food have been placed on a ship, or may determine that cargo on a plane has taken off and/or departed, therefore, requiring additional cushioning support. The event detector 218 may determine that a specific location has been reached within 200 feet, for example. For example, when a destination is reached, one or more, or even all, of the cushioning elements may be unexpanded or deflated to allow the objects to be unpacked.

At the operation 706, an impact or likely impact for the object is determined. For example, event detector 218 (FIG. 2), e.g., as an accelerometer or other instrument, may measure a sharp increase in force or acceleration due to free fall (e.g., indicating a likely impact) or a sharp force due to an impact on the container, for example.

Figure 8:
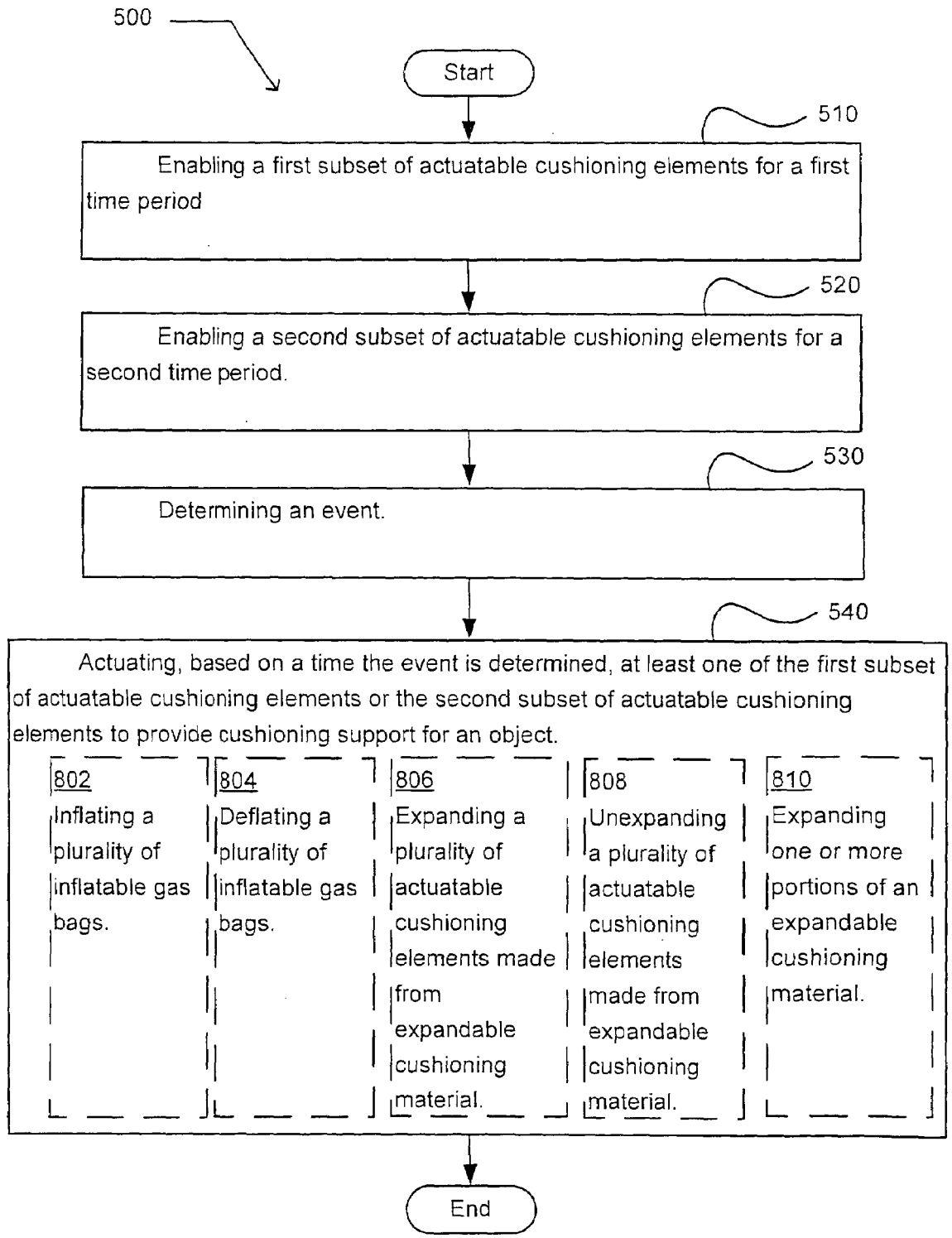
FIG. 8 illustrates an alternative embodiment of the example operational flow of FIG. 5.

FIG. 8 illustrates alternative embodiments of the example operational flow 500 of FIG. 5. FIG. 8 illustrates example embodiments where the actuating operation 540 may include at least one additional operation. Additional operations may include operations 802, 804, 806, 808 or 810.

At the operation 802, a plurality of inflatable gas bags are inflated. For example, in response to signals from element controller 214 (FIG. 2), stored energy reservoir 220 may release pressurized air or other gas to inflate a gas bag (e.g., element 210).

At the operation 804, a plurality of inflatable gas bags may be deflated. For example, previously inflated gas bags may be deflated based on control signals from element controller 214. For example, stored energy reservoir 220 in FIG. 2 may provide an exit or leakage point to allow gas to escape from the inflatable gas bag, thereby deflating the gas bag.

At the operation 806, a plurality of actuatable cushioning elements made from expandable cushioning material are expanded. For example, stored energy reservoir 220 in FIG. 2 may release electrical current, a chemical or other substance or energy to cause an expandable cushioning material to expand or increase in size.

At the operation 808, a plurality of actuatable cushioning elements made from expandable cushioning material are unexpanded. For example, stored energy reservoir 220 may release electrical current, a chemical or other substance or energy to cause an expandable cushioning material to unexpand or decrease in size.

At the operation 810, one or more portions of an expandable cushioning material are expanded. For example, stored energy reservoir 220 in FIG. 2 may release electrical current, a chemical or other substance or energy to cause one or more portions of expandable cushioning material 305 (FIG. 3) to expand.

Figure 9:
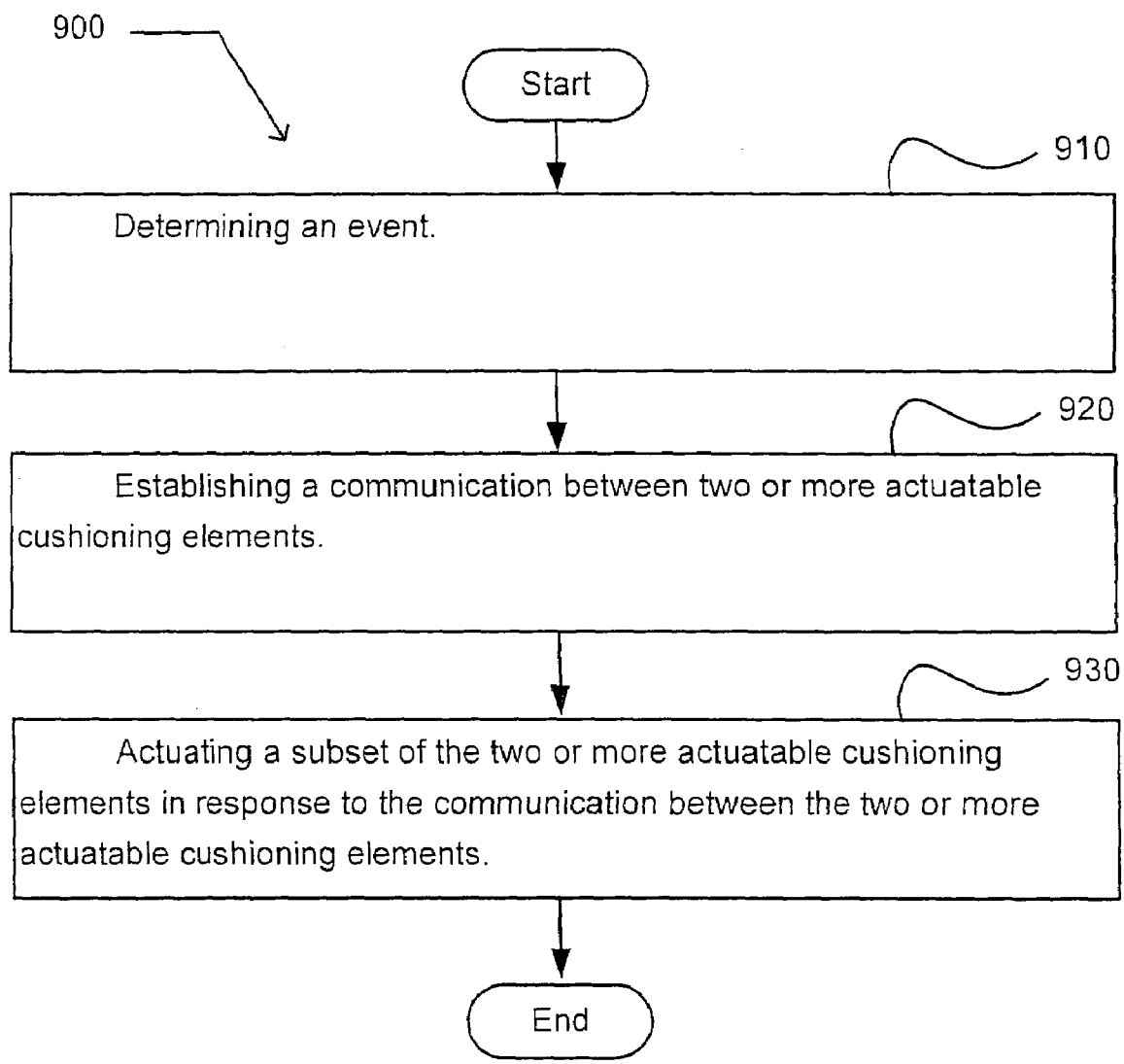
FIG. 9 illustrates an operational flow representing example operations related to actuatable cushioning elements.

FIG. 9 illustrates an operational flow 900 representing example operations related to actuatable cushioning elements. After a start operation, the operational flow 900 moves to a determining operation 910 where an event is determined. For example, an event detector 218, FIG. 2 (e.g., as an accelerometer) for actuatable cushioning element 118 may determine that an event has occurred, such as determining that an acceleration has exceeded a threshold, for example.

Then in establishing operation 920, a communication is established between two or more actuatable cushioning elements. For example, element controller 214 for actuatable cushioning element 118 may establish communication with element control logic 212 of another cushioning element (such as for element 122), via wireless transceivers 216 for each cushioning element. This may allow, for example, for the two or more actuatable cushioning elements (e.g., elements 118, 122) to notify each other when an event is detected, or to coordinate the actuation of one or more actuatable cushioning elements.

Then in actuating operation 930 a subset of the two or more actuatable cushioning elements is actuated in response to the communication between the two or more actuatable cushioning elements. For example, in response to communication via wireless transceivers 216 of elements 118 and 122, the stored energy reservoirs 220 for elements 118 and 122 may release gas or liquid to expand the actuatable cushioning elements 118, 122.

Figure 10:
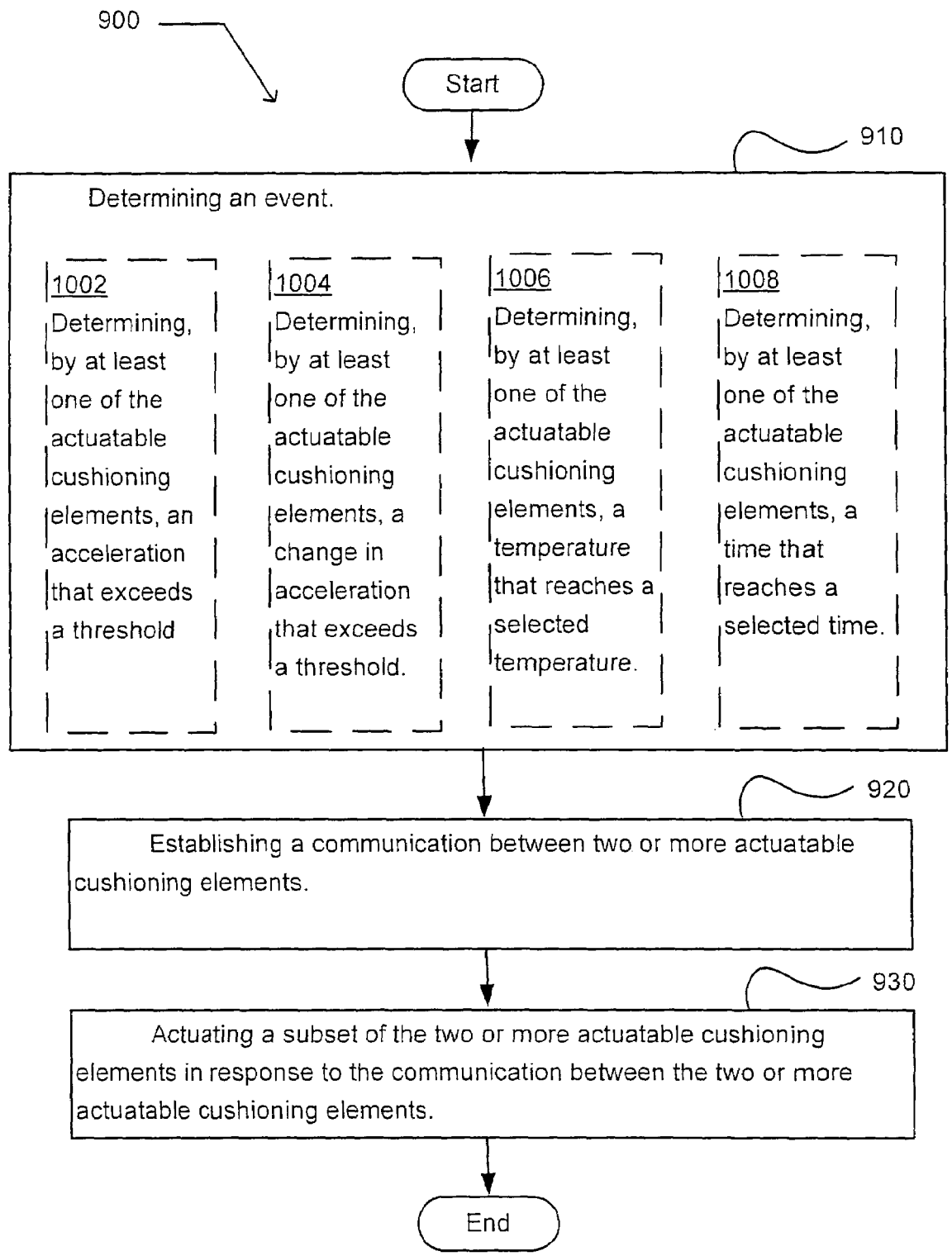
FIG. 10 illustrates an alternative embodiment of the example operational flow of FIG. 9.

FIG. 10 illustrates alternative embodiments of the example operational flow 900 of FIG. 9. FIG. 10 illustrates example embodiments where the determining operation 910 may include at least one additional operation. Additional operations may include operations 1002, 1004, 1006, or 1008.

At operation 1002, at least one of the actuatable cushioning elements determines an acceleration that exceeds a threshold. For example, event detector 218 (e.g., as an accelerometer) in FIG. 2 of an actuatable cushioning element may determine that an acceleration has exceeded a threshold, such as 0.2 G, where G indicates a force of gravity. When acceleration exceeds a threshold, this may indicate that a collision for the container 110 is likely, or that the container is in free fall or has been dropped, or other condition which may be damaging to the object inside the container 110.

At the operation 1004, at least one of the actuatable cushioning elements determines a change in acceleration that exceeds a threshold. For example, event detector 218 (e.g., as an accelerometer) in FIG. 2 of an actuatable cushioning element may determine that a change in acceleration has exceeded a threshold, such as 20%, or an increase in acceleration by X meters/$S^2$.

At the operation 1006, at least one of the actuatable cushioning elements determines a temperature that reaches a selected temperature. For example, event detector 218 (e.g., as a thermometer) in FIG. 2 of an actuatable cushioning element may determine that the current temperature (e.g., either inside or outside the container 110, FIG. 1) is 32 degrees Fahrenheit.

At the operation 1008, at least one of the actuatable cushioning elements determines a time that reaches a selected time. For example, event detector 218 (e.g., as a clock or other time measuring device) in FIG. 2 of an actuatable cushioning element may determine that the current time is now 12 noon.

Figure 11:
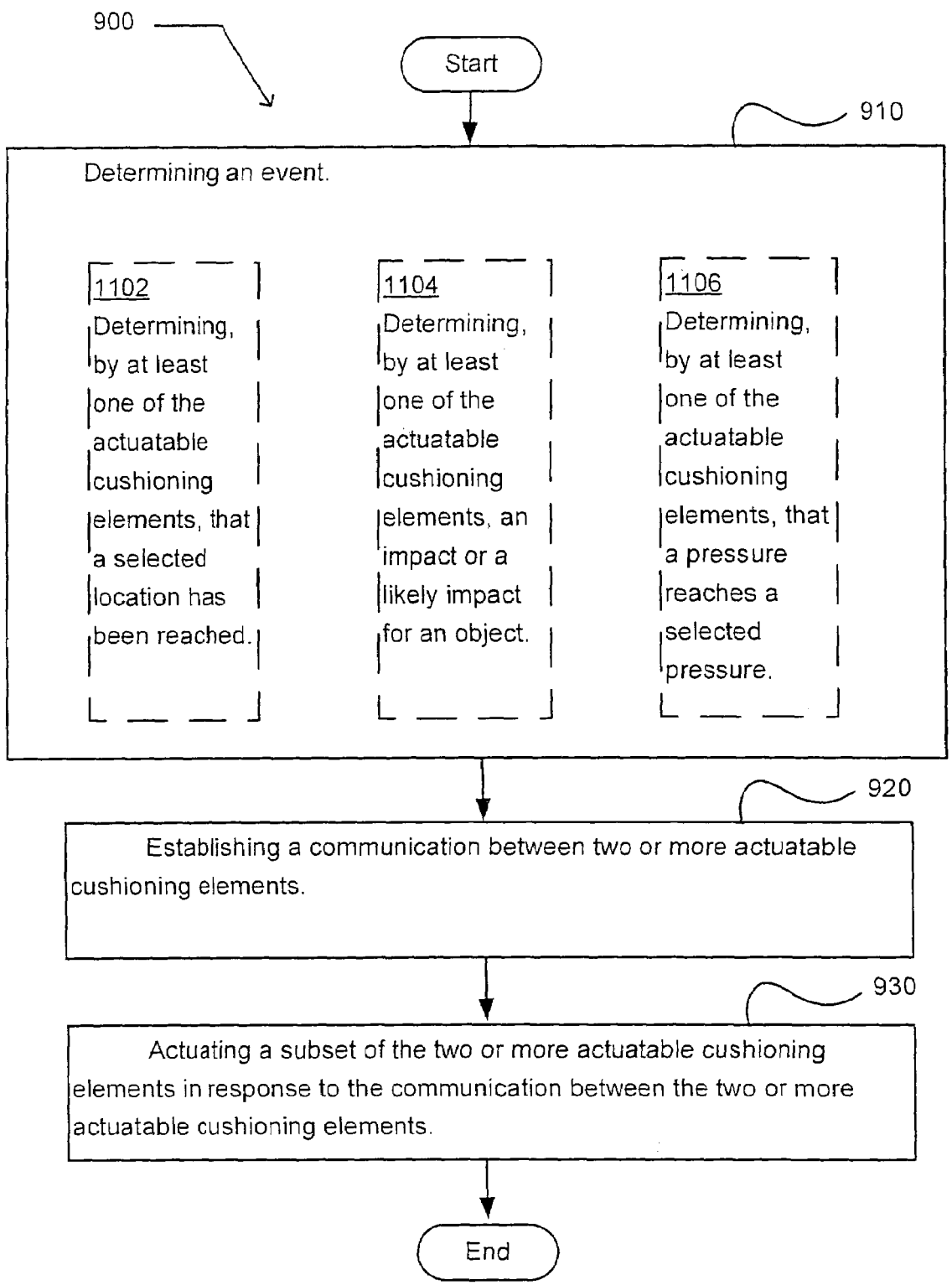
FIG. 11 illustrates an alternative embodiment of the example operational flow of FIG. 9.

FIG. 11 illustrates alternative embodiments of the example operational flow 900 of FIG. 9. FIG. 11 illustrates example embodiments where the determining operation 910 may include at least one additional operation. Additional operations may include operations 1102, 1104, or 1106.

At operation 1102, at least one of the actuatable cushioning elements determines that a selected location has been reached. For example, event detector 218 (e.g., as a GPS receiver) in FIG. 2 of an actuatable cushioning element may determine that a specific location has been reached, or that a specific location has been reached within a specific range (e.g., 50 feet). This may include, for example, determining that the object is approaching a specific location and is now within a specific range (e.g., 50 feet) of the specific location, or is moving away from a selected location and is within a specific range (e.g., 0.4 miles) of the selected location. These are merely some examples.

At the operation 1104, at least one of the actuatable cushioning elements determines an impact or a likely impact for the object. For example, event detector 218 (e.g., as an accelerometer) in FIG. 2 of an actuatable cushioning element may determine that a rapid acceleration or rapid change in acceleration indicates an impact or likely impact for the object.

At the operation 1106, at least one of the actuatable cushioning elements determines that a pressure reaches a selected pressure. For example, event detector 218 (e.g., as a barometer, pressure sensor, or other instrument) in FIG. 2 of an actuatable cushioning element may determine that a pressure between one or more cushioning elements has reached a selected pressure. The selected pressure may refer to pressure between actuatable cushioning elements, mechanical pressure, atmospheric pressure (e.g., such as when an object is on a plane at a certain altitude), pressure between an actuatable cushioning element and the object, or other pressure. For example, if a low pressure is detected between the object and a cushioning element, this may indicate that insufficient cushioning support is being provided to the object.

Figure 12:
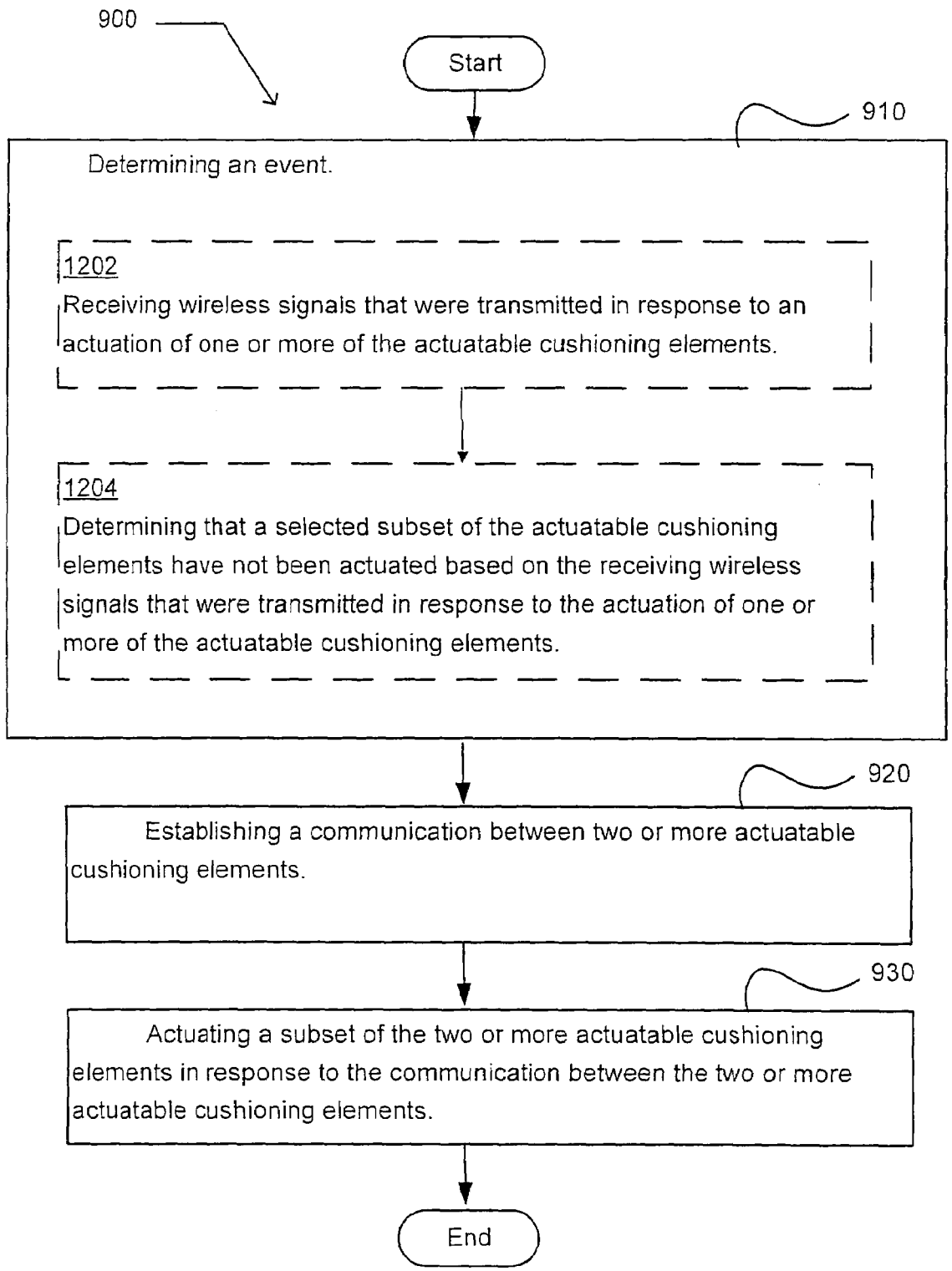
FIG. 12 illustrates an alternative embodiment of the example operational flow of FIG. 9.

FIG. 12 illustrates alternative embodiments of the example operational flow 900 of FIG. 9. FIG. 12 illustrates example embodiments where the determining operation 910 may include at least one additional operation. Additional operations may include operations 1202 and/or 1204.

At operation 1202, wireless signals are received that were transmitted in response to an actuation of one or more of the actuatable cushioning elements. For example, wireless transceiver 216 (FIG. 2) of actuatable cushioning element 118 (FIG. 1) may receive wireless signals transmitted by actuatable cushioning elements 126 and 130 based on the actuation of such elements. In an example embodiment, these received wireless signals may notify or provide information to actuatable cushioning element 118 indicating which elements are expanded or not expanded. Alternatively, wireless transceiver 152 of central control logic 150 (FIG. 1) may receive wireless signals that were transmitted in response to actuation of one or more cushioning elements.

At operation 1204, a selected subset of the actuatable cushioning elements are determined to have not been actuated based on the receiving wireless signals that were transmitted in response to the actuation of one or more of the actuatable cushioning elements. For example, element controller 214 (FIG. 2) of actuatable cushioning element 118 (FIG. 1) may determine, based on the received wireless signals, that 20% of the actuatable cushioning elements have not been actuated, which may indicate that cushioning support for the object is presently inadequate. Alternatively, central controller 154 of central control logic 150 (FIG. 1) may determine that a threshold number of actuatable cushioning elements have not been actuated based on received wireless signals.

Figure 13:
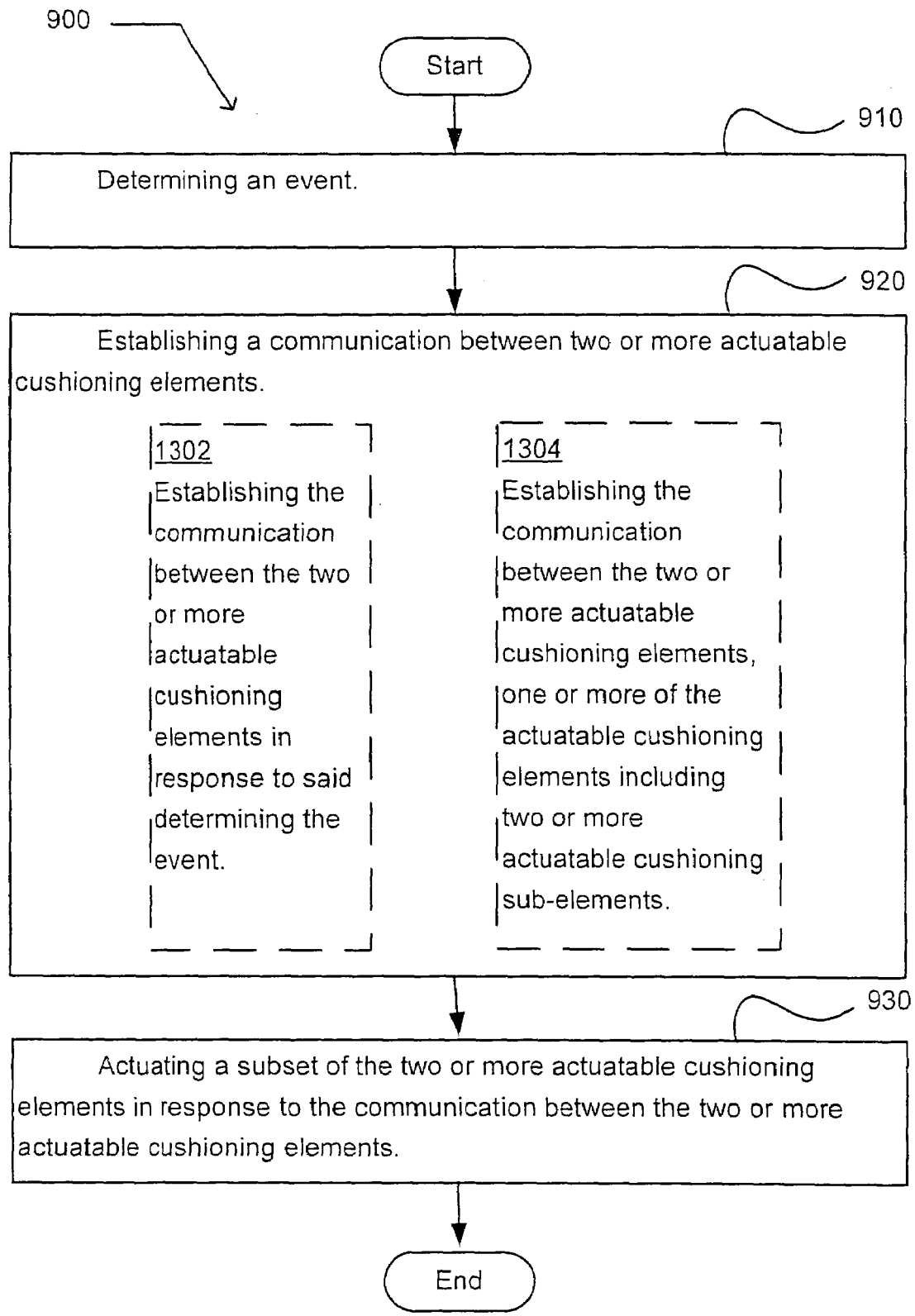
FIG. 13 illustrates an alternative embodiment of the example operational flow of FIG. 9.

FIG. 13 illustrates alternative embodiments of the example operational flow 900 of FIG. 9. FIG. 13 illustrates example embodiments where the establishing operation 920 may include at least one additional operation. Additional operations may include operations 1302 or 1304.

At operation 1302, the communication is established between the two or more actuatable cushioning elements in response to said determining the event. For example, a wireless transceiver 216 (FIG. 2) of actuatable cushioning element 118 (FIG. 1) may establish a wireless communication with a wireless transceiver 216 of actuatable cushioning element 120 (FIG. 1).

At operation 1304, the communication is established between the two or more actuatable cushioning elements, one or more of the actuatable cushioning elements including two or more actuatable cushioning sub-elements. For example, a wireless transceiver 216 (FIG. 2) of actuatable cushioning element 118 (FIG. 1) may establish a wireless communication with a wireless transceiver 216 of actuatable cushioning element 120 (FIG. 1). In this example embodiment, actuatable cushioning element 118 (FIG. 1), for example, may include three actuatable sub-elements, such as actuatable sub-elements 410, 415 and 420 (FIG. 4).

Figure 14:
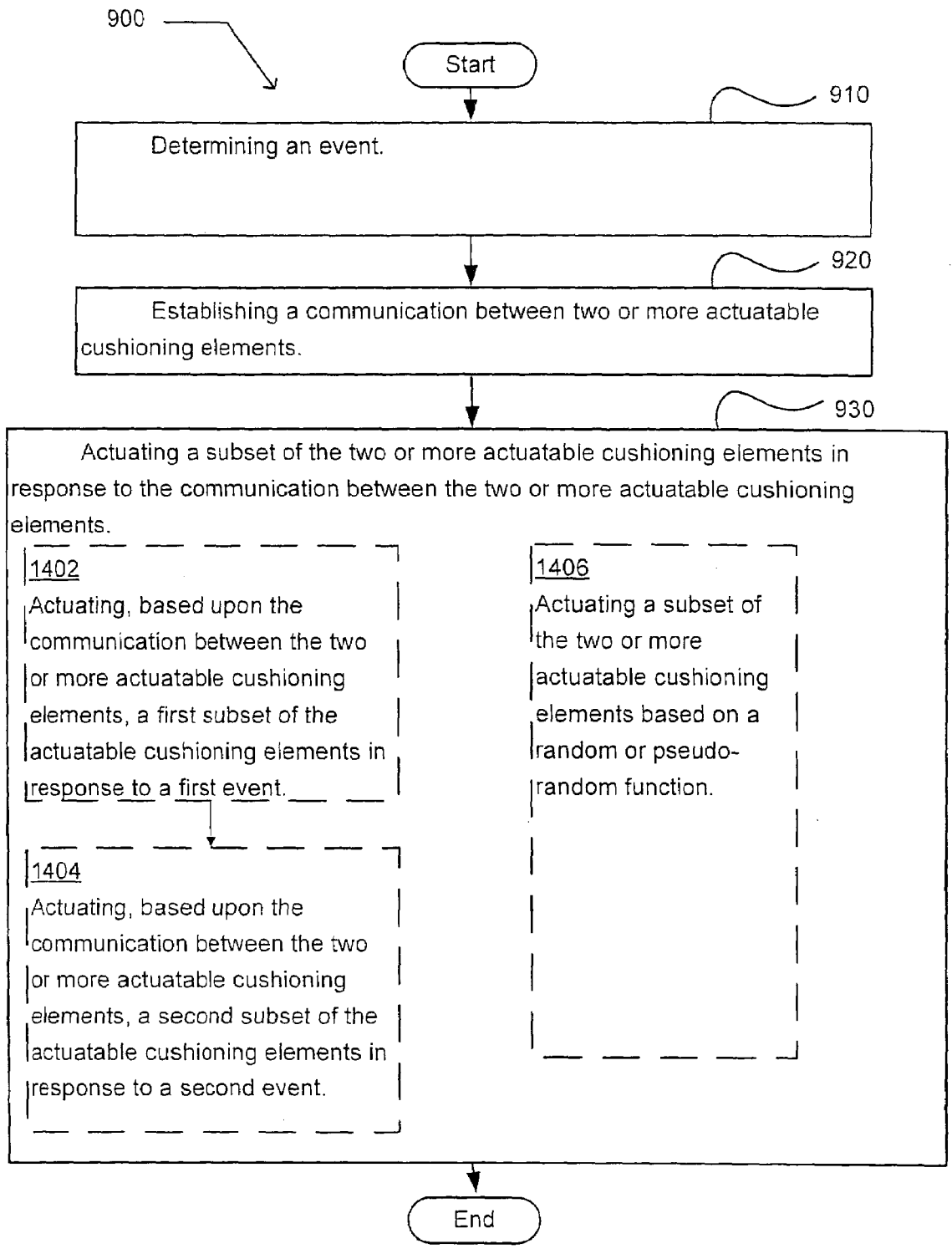
FIG. 14 illustrates an alternative embodiment of the example operational flow of FIG. 9.

FIG. 14 illustrates alternative embodiments of the example operational flow 900 of FIG. 9. FIG. 14 illustrates example embodiments where the actuating operation 930 may include at least one additional operation. Additional operations may include operations 1402, 1404 and/or 1406.

At operation 1402, a first subset of the actuatable cushioning elements is actuated based upon the communication between the two or more actuatable cushioning elements in response to a first event. For example, actuatable cushioning elements 114, 118 and 128 may be expanded to provide cushioning support based on the communication in response to detecting that the container 110 has been dropped (e.g., an event where acceleration may exceed a threshold). The actuatable cushioning elements 114, 118 and 128 may be expanded based on control signals from element controller 214 (FIG. 2) for each element, causing a stored energy reservoir 220 (FIG. 2) for each of the elements 114, 118 and 128 to release gas or other material to expand or inflate the actuatable element, for example.

At operation 1404, a second subset of the actuatable cushioning elements is actuated based upon the communication between the two or more actuatable cushioning elements in response to a second event. For example, in response to one (or more) of the actuatable cushioning elements detecting that a specific location (e.g., destination location) has been reached, all of the currently expanded cushioning elements may be unexpanded, e.g., to allow the object to be unpacked more easily from the container 110. For example, an element controller 214 (FIG. 2) for each expanded actuatable cushioning element may release gas from the element to allow the element to unexpand or deflate.

At operation 1406, a subset of the two or more actuatable cushioning elements is actuated based on a random or pseudo-random function. For example, one or more of the actuatable cushioning elements may actuate in a random or pseudo-random fashion. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 0.10 events. This is merely an example, and other random or pseudo-random functions may be used.

Figure 15:
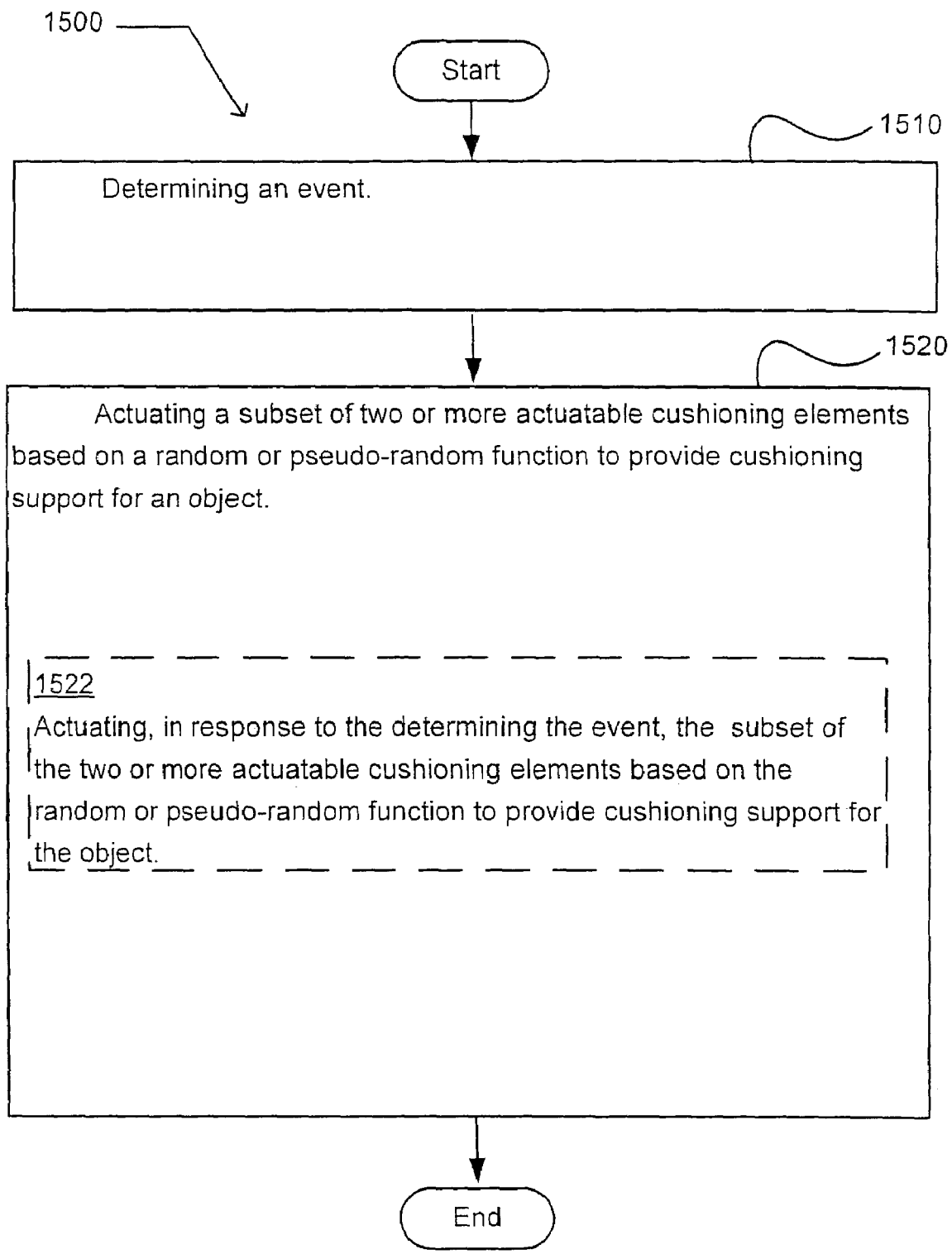
FIG. 15 illustrates an operational flow representing example operations related to actuatable cushioning elements.

FIG. 15 illustrates an operational flow 1500 representing example operations related to actuatable cushioning elements. After a start operation, the operational flow 1500 moves to a determining operation 1510 where an event is determined. For example, event detector 218 (FIG. 2) of an actuatable cushioning element or event detector 158 (FIG. 1) may determine that a specific location has been reached, or detect an acceleration that exceeds a threshold, or other event.

Then, at actuating operation 1520, a subset of two or more actuatable cushioning elements is actuated based on a random or a pseudo-random function to provide cushioning support for an object. For example, one or more of the actuatable cushioning elements may actuate in a random fashion in response to signals provided by all element controller 214. For example, each actuatable cushioning element may have a 10% probability of actuating, such as for a given time period or in response to an event. Thus, statistically, for example, 10% of the actuatable cushioning elements may be actuatable or enabled for a specific period of time, or 10% may actuate in response to each event. This may allow, for example, a group or subset of actuatable cushioning elements to be actuated or to be actuatable for each of up to 10 time periods or for each of up to 10 events. This is merely an example, and other random or pseudo-random functions may be used.

FIG. 15 also illustrates alternative embodiments of the example operational flow 1500, where the actuating operation 1520 may include at least one additional operation. Additional operations may include at least operation 1522.

At operation 1522, the subset of the two or more actuatable cushioning elements is actuated, in response to the determining the event, based on the random or the pseudo-random function to provide cushioning support for the object. An element controller 214 for each actuatable cushioning element may actuate the element based on a random or pseudo-random function. Thus, for example, approximately 10% of the actuatable cushioning elements may actuate in response to each event. This may allow a group of actuatable cushioning elements to respond for or in response to a series of events.

Figure 16:
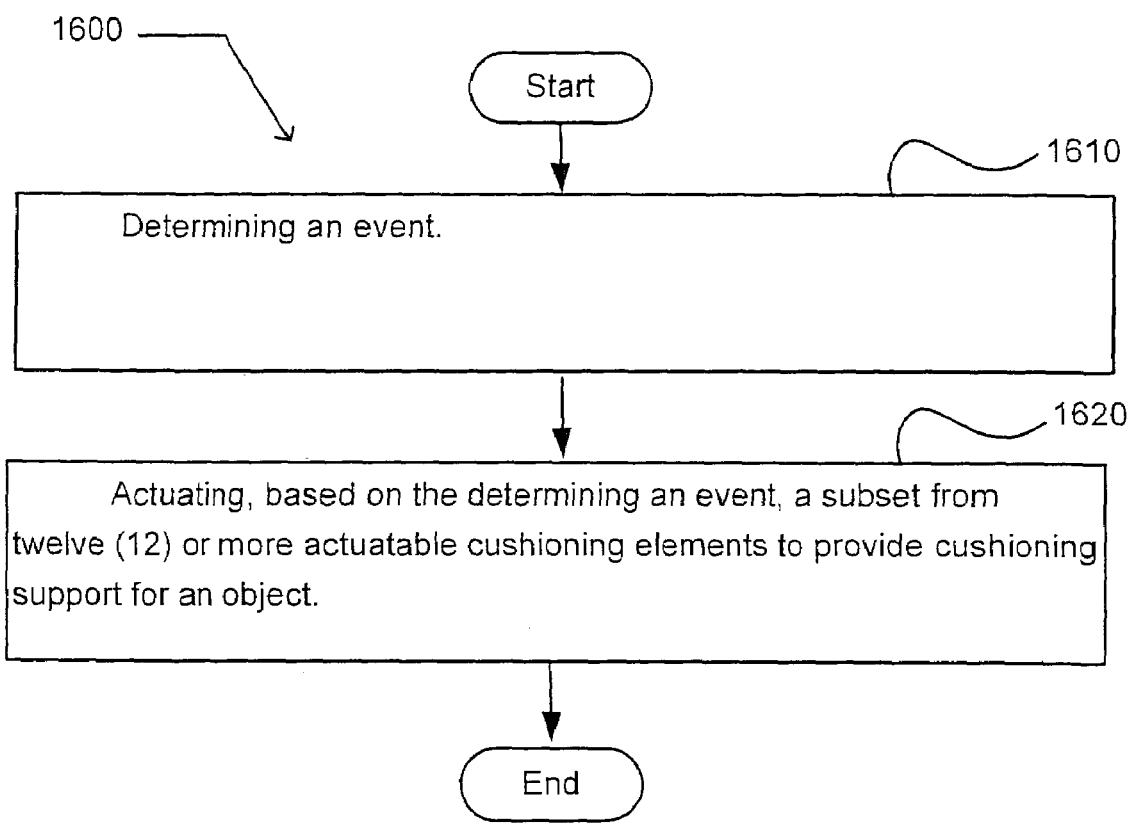
FIG. 16 illustrates an operational flow representing example operations related to actuatable cushioning elements.

FIG. 16 illustrates an operational flow 1600 representing example operations related to actuatable cushioning elements. After a start operation, the operational flow 1600 moves to a determining operation 1610 where an event is determined. For example, event detector 158 of central control logic 150 (FIG. 1) may determine that a specific location has been reached, or detect an acceleration that exceeds a threshold, or other event.

At actuating operation 1620, a subset from 12 or more actuatable cushioning elements is actuated, based on the determining an event, to provide cushioning support for an object. For example, central controller 154 (FIG. 1), e.g., in response to event detector 158 determining or detecting an event, may transmit signals via transceiver 152 to 12 or more actuatable cushioning elements, which may cause a stored energy reservoir 220 at each of the elements to actuate the associated element.

Figure 17:
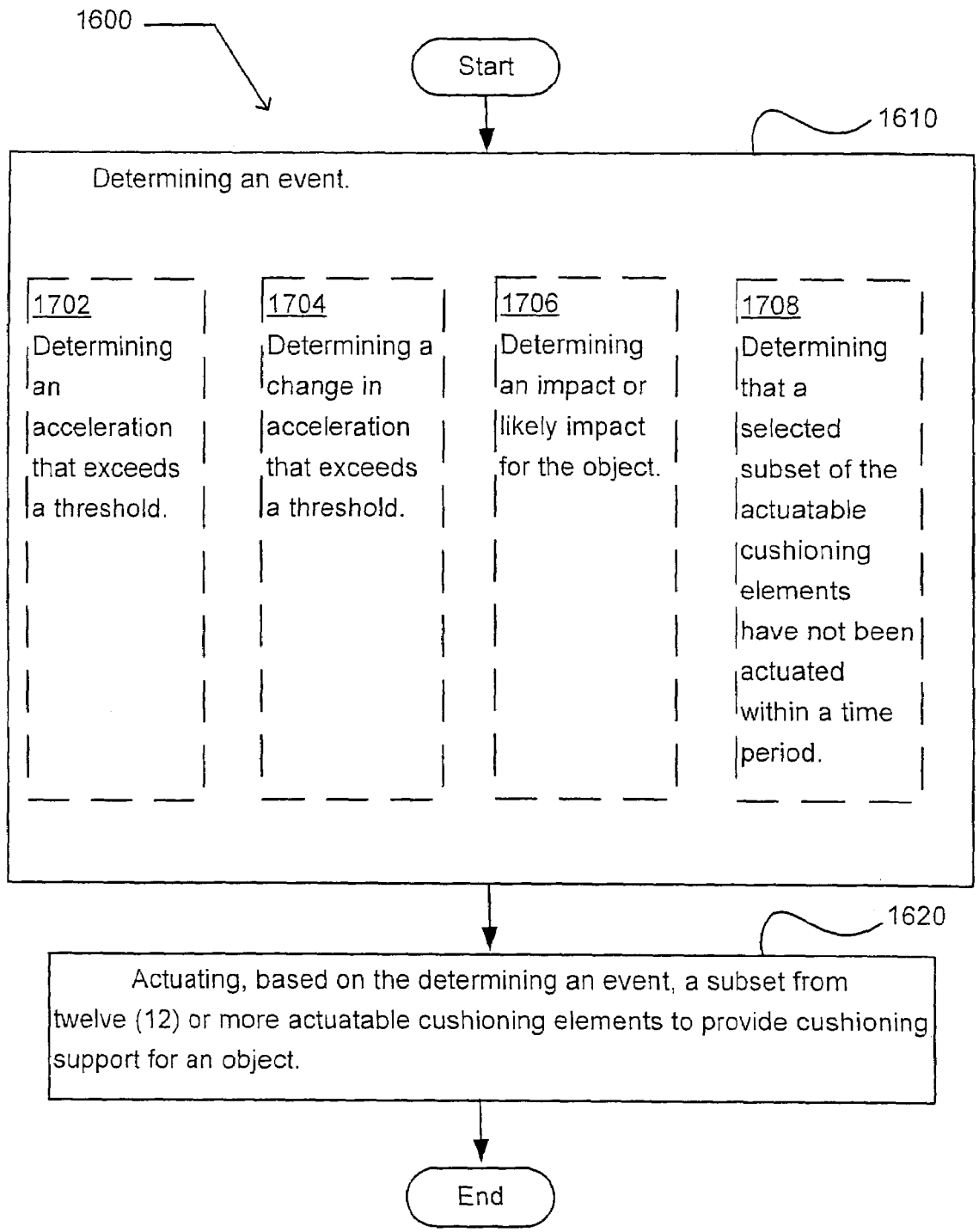
FIG. 17 illustrates an alternative embodiment of the example operational flow of FIG. 16.

FIG. 17 illustrates alternative embodiments of the example operational flow 1600 of FIG. 16. FIG. 17 illustrates example embodiments where the determining operation 1610 may include at least one additional operation. Additional operations may include operations 1702, 1704, 1706 or 1708.

At operation 1702, an acceleration that exceeds a threshold is determined. For example, event detector 158 (e.g., as an accelerometer) in FIG. 1, may determine that an acceleration has exceeded a threshold, such as 0.4 G, where G indicates a force of gravity. When acceleration exceeds a threshold, this may indicate or suggest that a collision for the container 110 is likely, or that the container is in free fall or has been dropped, or other condition which may be damaging to the object inside the container 110. Thus, in such case, it may be desirable to increase cushioning support for the object, e.g., by actuating or expanding additional cushioning elements.

At the operation 1704, a change in acceleration that exceeds a threshold is determined. For example, event detector 158 (FIG. 1) may determine that acceleration has increased from 0 G to 0.3 G within a specific period of time, e.g., which may indicate a likely collision for the container 110.

At the operation 1706, an impact or likely impact for the object is determined. For example, event detector 158 (FIG. 1), e.g., as an accelerometer or other instrument, may measure a sharp increase in force or acceleration due to free fall (e.g., indicating a likely impact) or a sharp force due to an impact on the container, for example.

At the operation 1708, it is determined that a selected subset of the actuatable cushioning elements have not been actuated within a time period. For example, central controller 154 of central control logic 150 (FIG. 1) may determine that less than 20% of the actuatable cushioning elements in container 110 have been actuated over the last 2 hours, e.g., based on signals received from the actuatable cushioning elements. This may indicate, for example, that cushioning support for the object is inadequate.

Figure 18:
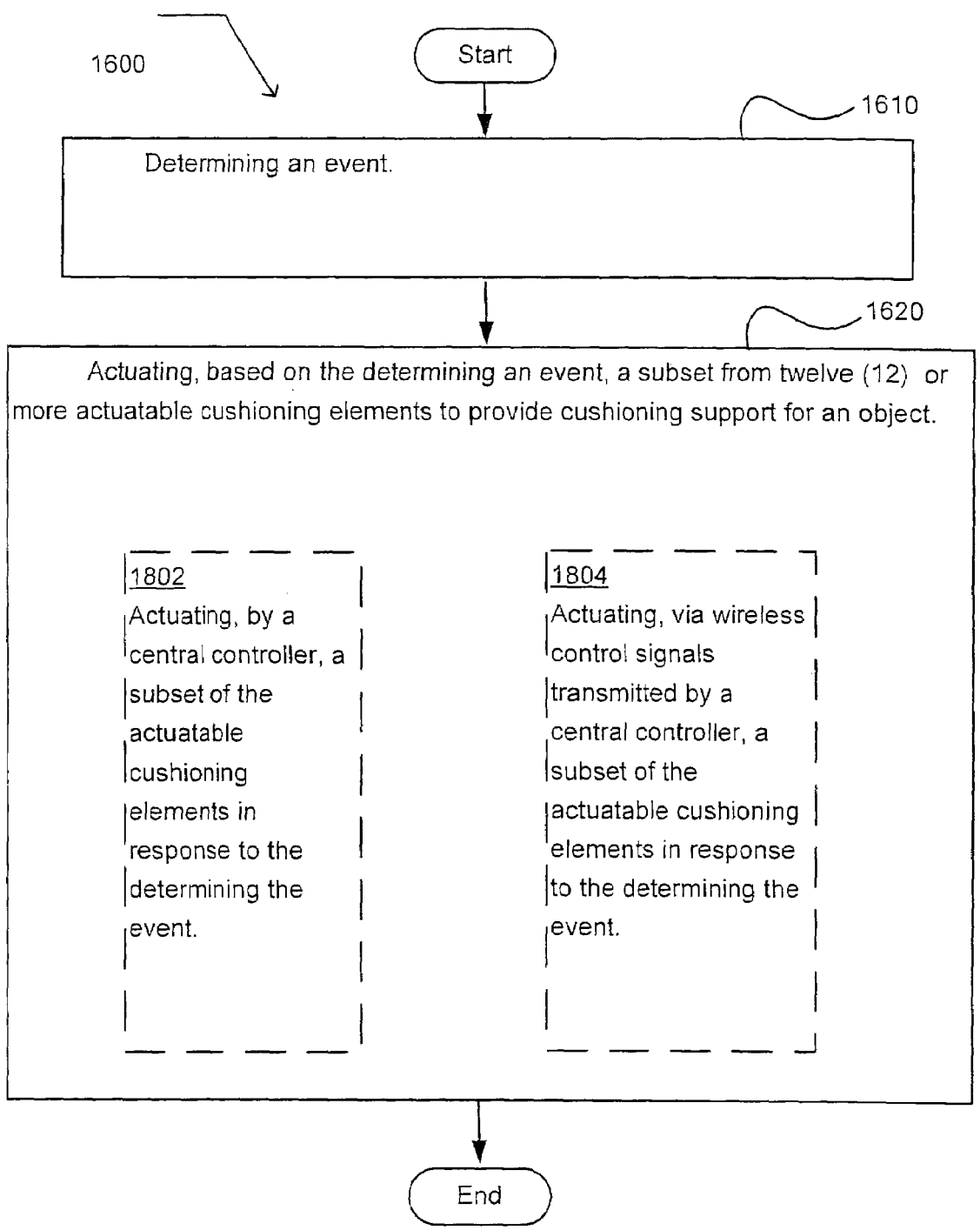
FIG. 18 illustrates an alternative embodiment of the example operational flow of FIG. 16.

FIG. 18 illustrates alternative embodiments of the example operational flow 1600 of FIG. 16. FIG. 18 illustrates example embodiments where the actuating operation 1620 may include at least one additional operation. Additional operations may include operations 1802 or 1804.

At operation 1802, a central controller actuates a subset of the actuatable cushioning elements in response to the determining the event. For example, central controller 154 (FIG. 1), e.g., in response to event detector 158 determining or detecting an event, may transmit signals via transceiver 152 to a group of actuatable cushioning elements, which may cause a stored energy reservoir 220 at each of the elements to actuate the associated element.

At operation 1804, a central controller actuates, via transmission of wireless control signals, a subset of the actuatable cushioning elements in response to the determining the event. For example, central controller 154 (FIG. 1), e.g., in response to event detector 158 determining or detecting an event, may transmit wireless control signals via wireless transceiver 152 to one or more actuatable cushioning elements, which may cause a stored energy reservoir 220 at the one or more cushioning elements to actuate the associated element.

Figure 19:
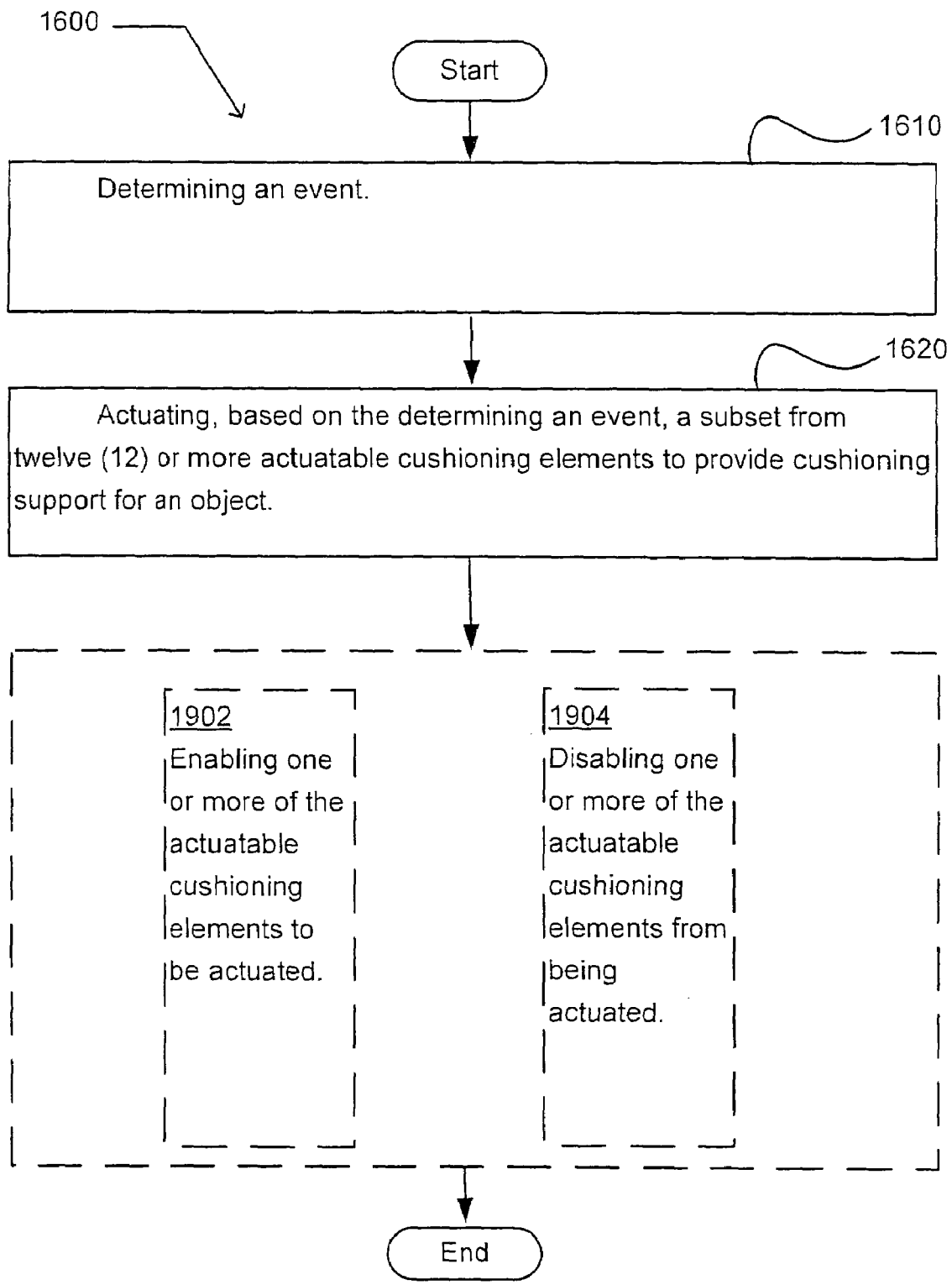
FIG. 19 illustrates an alternative embodiment of the example operational flow of FIG. 16.

FIG. 19 illustrates alternative embodiments of the example operational flow 1600 of FIG. 16. FIG. 19 illustrates example embodiments that may include at least one additional operation. Additional operations may include operations 1902 or 1904.

At operation 1902, one or more of the actuatable cushioning elements are enabled to be actuated. For example, central controller 154 may transmit signals via wireless transceiver 152 to enable actuatable cushioning elements 116 and 118 to be actuated. This may allow, for example, for cushioning elements 116 and 118 to be actuated, e.g., in response to an event.

At operation 1904, one or more of the actuatable cushioning elements are disabled from being actuated. For example, central controller 154 may transmit signals via wireless transceiver 152 to disable actuatable cushioning elements 116 and 118 from being actuated. This may prevent, for example, for cushioning elements 116 and 118 from being actuated, e.g., in response to an event.

FIG. 20 illustrates an example apparatus 2000 in which embodiments may be implemented. The apparatus 2000 may include at least two actuatable cushioning elements 2010 configured to provide cushioning support for an object. For example, a system 100 (FIG. 1) may include actuatable cushioning elements 116 and 118.

The at least two actuatable cushioning elements 2010 may include a first subset of actuatable cushioning elements 2012 enabled to actuate in response to an event during a first time period. For example, actuatable cushioning element 116 may be enabled to actuate during a first hour that container 110 is in-transit to a destination location.

The at least two actuatable cushioning elements 2010 may include a second subset of actuatable cushioning elements 2014 enabled to actuate in response to an event during a second time period. For example, actuatable cushioning element 118 may be enabled to actuate during a second hour that container 110 is in-transit to a destination location.

FIG. 21 illustrates alternative embodiments of the example apparatus 2000 of FIG. 20. FIG. 21 illustrates example embodiments that may include at least one additional implementation. Additional implementations may include implementations 2102, 2104, or 2106.

At implementation 2102, the actuatable cushioning elements are 2.5 cm in width or less in an unexpanded state. For example, actuatable cushioning elements 116 and 118 may be 2.0 cm in width in an unexpanded state.

At implementation 2104, the actuatable cushioning elements are 2.5 cm in width or more in an unexpanded state. For example, actuatable cushioning elements 116 and 118 may be 3.7 cm in width in an unexpanded state.

At implementation 2106, the actuatable cushioning elements are 8 cm in width or less in an unexpanded state. For example, actuatable cushioning elements 116 and 118 may be 4.6 cm in width in an unexpanded state.

FIG. 22 illustrates alternative embodiments of the example apparatus 2000 of FIG. 20. FIG. 22 illustrates example embodiments that may include at least one additional implementation. Additional implementations may include implementations 2202, 2204, 2206, 2208, 2209, 2210, 2212, 2214, 2216, 2217 and/or 2219.

At implementation 2202, the at least two actuatable cushioning elements include at least 12 actuatable cushioning elements, such as 14 actuatable cushioning elements, for example.

At implementation 2204, the at least two actuatable cushioning elements include at least 20 actuatable cushioning elements, such as 25 actuatable cushioning elements, for example.

At implementation 2206, the at least two actuatable cushioning elements include at least 50 actuatable cushioning elements, such as 60 actuatable cushioning elements, for example.

At implementation 2208, the at least two actuatable cushioning elements include at least 100 actuatable cushioning elements, such as 125 actuatable cushioning elements, for example.

At implementation 2209, the at least two actuatable cushioning elements include at least 500 actuatable cushioning elements, such as 525 actuatable cushioning elements, for example.

At implementation 2210, the at least two actuatable cushioning elements include at least one inflatable gas bag, such as an inflatable air bag, for example.

At implementation 2212, the at least two actuatable cushioning elements include at least one actuatable cushioning element of an expandable cushioning material, such as an expandable cushioning material 305 (FIG. 3), for example.

At implementation 2214, the at least two actuatable cushioning elements include a plurality actuatable portions of an expandable cushioning material, such as portions 310, 315, 320, 325, and/or 330 of expandable cushioning material 305 (FIG. 3), for example.

At implementation 2216, the at least two actuatable cushioning elements include at least two re-usable actuatable cushioning elements 2217, and/or at least two disposable actuatable cushioning elements 2219. For example, the disposable actuatable cushioning elements may be one-time use elements, whereas the re-usable actuatable cushioning elements may be repeatedly expanded, unexpanded, and re-expanded.

Figure 23:
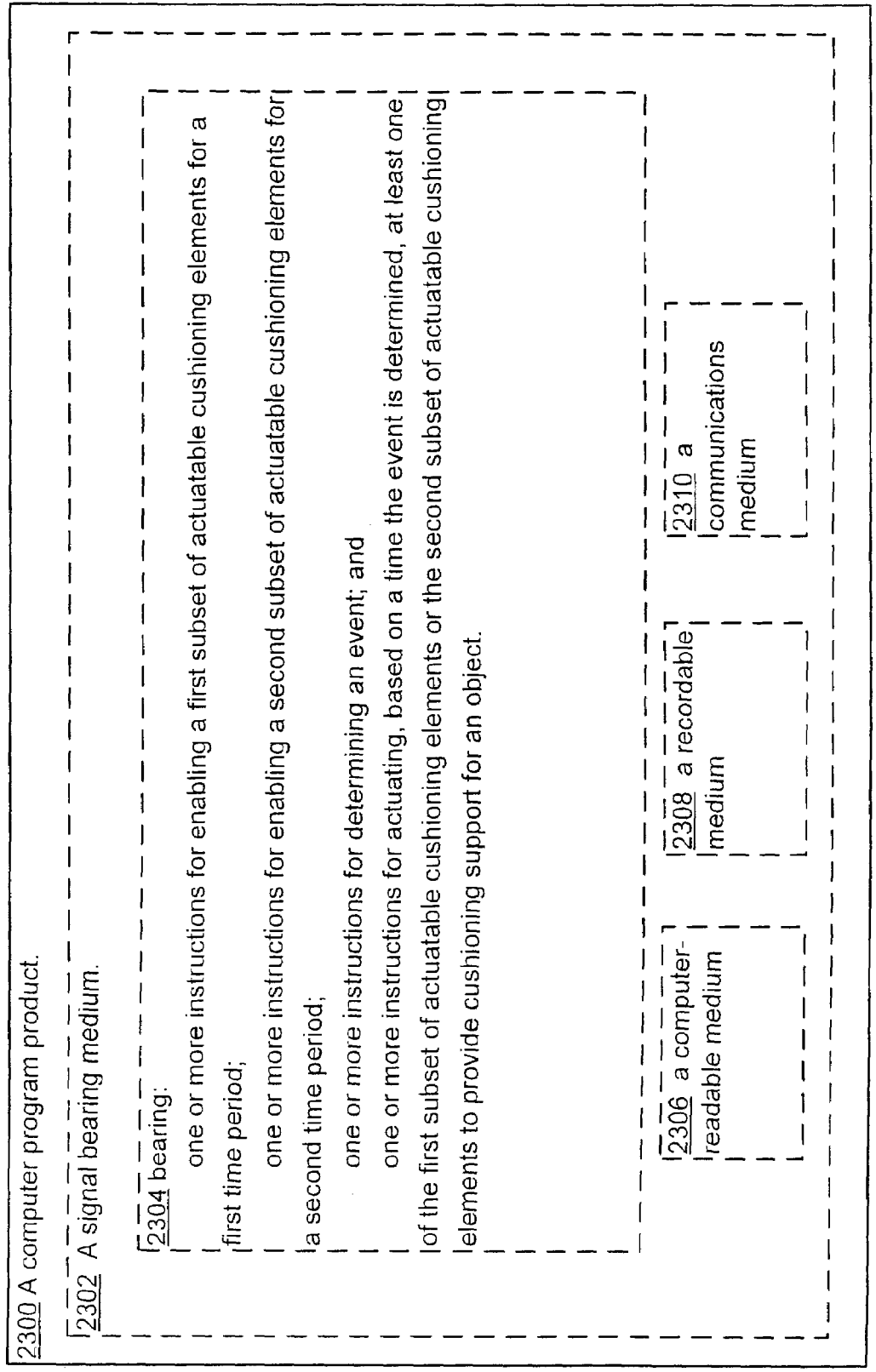
FIG. 23 illustrates a partial view of an example computer program product that includes a computer program for executing a computer process on a computing device.

FIG. 23 illustrates a partial view of an example computer program product 2300 that includes a computer program 2304 for executing a computer process on a computing device. An embodiment of the example computer program product 2300 is provided using a signal bearing medium 2302, and may include one or more instructions for enabling a first subset of actuatable cushioning elements for a first time period, the signal bearing medium also bearing one or more instructions for enabling a second subset of actuatable cushioning elements for a second time period, the signal bearing medium also bearing one or more instructions for determining an event, and the signal bearing medium also bearing one or more instructions for actuating, based on a time the event is determined, at least one of the first subset actuatable cushioning elements and the second subset of actuatable cushioning elements to provide cushioning support for an object. The one or more instructions may be, for example, computer executable and/or logic-implemented instructions. In one implementation, the signal-bearing medium 2302 may include a computer-readable medium 2306. In one implementation, the signal bearing medium 2302 may include a recordable medium 2308. In one implementation, the signal bearing medium 2302 may include a communications medium 2310.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including," should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
   circuitry for determining at least one first event associated with packing of at least one container and at least one second event associated with movement of the at least one container; and
   circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

2. The system of claim 1, wherein the circuitry for determining at least one first event associated with packing of at least one container and at least one second event associated with movement of the at least one container comprises:
   circuitry for determining at least one first event associated with packing of at least one container, at least one second event associated with movement of the at least one container, and at least one third event associated with unpacking of the at least one container.

3. The system of claim 2, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
   circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container, (ii) at least partially actuating at least some of the two or more actuatable cushioning elements internal of the at least one container in response to the at least one second event associated with movement of the at least one container, and (iii) at least partially de-actuating at least some of the two or more actuatable cushioning elements internal of the at least one container in response to the at least one third event associated with unpacking of the at least one container.

4. The system of claim 1, wherein the circuitry for determining at least one first event associated with packing of at least one container and at least one second event associated with movement of the at least one container comprises:
   circuitry for determining, at one or more different times, at least one first event associated with packing of at least one container and at least one second event associated with movement of the at least one container.

5. The system of claim 1, wherein the circuitry for determining at least one first event associated with packing of at least one container and at least one second event associated with movement of the at least one container comprises:
   circuitry for determining at least one first event associated with packing of at least one container and at least one second event associated with impact or likely impact of the at least one container.

6. The system of claim 1, wherein the circuitry for determining at least one first event associated with packing of at least one container and at least one second event associated with movement of the at least one container comprises:
   circuitry for determining, at least partially from user input, at least one first event associated with packing of at least one container and at least one second event associated with movement of the at least one container.

7. The system of claim 1, wherein the circuitry for determining at least one first event associated with packing of at least one container and at least one second event associated with movement of the at least one container comprises:
   circuitry for determining, at least partially from one or more event detectors, at least one first event associated with packing of at least one container and at least one second event associated with movement of the at least one container.

8. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing, at one or more different times, one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

9. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container, (ii) at least partially actuating at least some of the two or more actuatable cushioning elements internal of the at least one container in response to the at least one second event associated with movement of the at least one container, and (iii) receiving status information associated with at least some of the two or more actuatable cushioning elements internal of the at least one container.

10. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing one or more communications with at least some of two or more reusable actuatable cushioning elements internal of the at least one container for (i) at least partially actuating at least some of the two or more reusable actuatable cushioning elements internal of the at least one container in response to the at least one first event associated with packing of the at least one container and (ii) at least partially actuating at least some of the two or more reusable actuatable cushioning elements internal of the at least one container in response to the at least one second event associated with movement of the at least one container.

11. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing one or more communications with at least some of two or more actuatable cushioning elements internal of the at least one container for (i) at least partially inflating one or more portions of at least some of the two or more actuatable cushioning elements internal of the at least one container in response to the at least one first event associated with packing of the at least one container and (ii) at least partially inflating one or more portions of at least some of the two or more actuatable cushioning elements internal of the at least one container in response to the at least one second event associated with movement of the at least one container.

12. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing one or more communications with at least some of two or more actuatable cushioning elements internal of the at least one container for (i) at least partially expanding one or more portions of at least some of the two or more actuatable cushioning elements internal of the at least one container in response to the at least one first event associated with packing of the at least one container and (ii) at least partially expanding one or more portions of at least some of the two or more actuatable cushioning elements internal of the at least one container in response to the at least one second event associated with movement of the at least one container.

13. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
  circuitry for establishing one or more communications with at least some of two or more unrestrained actuatable cushioning elements internal of the at least one container for (i) at least partially actuating at least some of the two or more unrestrained actuatable cushioning elements internal of the at least one container in response to the at least one first event associated with packing of the at least one container and (ii) at least partially actuating at least some of the two or more unrestrained actuatable cushioning elements internal of the at least one container in response to the at least one second event associated with movement of the at least one container.

14. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
    circuitry for establishing one or more communications with at least some of two or more actuatable cushioning elements internal of the at least one container for (i) at least partially actuating for at least one first time period at least some of the two or more actuatable cushioning elements internal of the at least one container in response to the at least one first event associated with packing of the at least one container and (ii) at least partially actuating for at least one second time period at least some of the two or more actuatable cushioning elements internal of the at least one container in response to the at least one second event associated with movement of the at least one container.

15. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
    circuitry for establishing one or more communications with at least some of two or more actuatable cushioning elements internal of the at least one container for (i) at least partially actuating for at least one first time period at least some of the two or more actuatable cushioning elements internal of the at least one container in response to the at least one first event associated with packing of the at least one container and (ii) at least partially actuating for at least one different second time period at least some of the two or more actuatable cushioning elements internal of the at least one container in response to the at least one second event associated with movement of the at least one container.

16. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
    circuitry for establishing one or more communications with at least some of two or more actuatable cushioning elements internal of the at least one container for (i) at least partially actuating for at least one first time period at least some of the two or more actuatable cushioning elements internal of the at least one container in response to the at least one first event associated with packing of the at least one container and (ii) at least partially actuating for at least one at least partially overlapping second time period at least some of the two or more actuatable cushioning elements internal of the at least one container in response to the at least one second event associated with movement of the at least one container.

17. The system of claim 1, wherein the circuitry for establishing one or more communications with at least some of two or more actuatable cushioning elements internal of the at least one container for (i) at least partially actuating at least some of the two or more actuatable cushioning elements internal of with the at least one container in response to the at least one first event associated with packing of the at least one container and (ii) at least partially actuating at least some of the two or more actuatable cushioning elements internal of the at least one container in response to the at least one second event associated with movement of the at least one container comprises:
    circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some other of the two or more actuatable cushioning elements internal of the at least one container in response to the at least one second event associated with movement of the at least one container.

18. The system of claim 1, wherein the circuitry for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container comprises:
    circuitry for establishing one or more communications with at least some of two or more actuatable cushioning sub-elements internal of the at least one container for (i) at least partially actuating at least some of the two or more actuatable cushioning sub-elements internal of the at least one container in response to the at least one first event associated with packing of the at least one container and (ii) at least partially actuating at least some of the two or more actuatable cushioning sub-elements internal of the at least one container in response to the at least one second event associated with movement of the at least one container.

19. A system comprising:
    means for determining at least one first event associated with packing of at least one container and at least one second event associated with movement of the at least one container; and
    means for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

20. A method comprising:
- determining at least one first event associated with packing of at least one container and at least one second event associated with movement of the at least one container; and
- establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

21. Non-transitory computer readable media bearing one or more instructions for facilitating operations comprising:
- determining at least one first event associated with packing of at least one container and at least one second event associated with movement of the at least one container; and
- establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

22. A system comprising:
- one or more event detectors for determining at least one first event associated with packing of at least one container and at least one second event associated with movement of the at least one container; and
- one or more controllers for establishing one or more communications with at least some of two or more actuatable cushioning elements internal of the at least one container for (i) at least partially actuating at least some of the two or more actuatable cushioning elements internal of the at least one container in response to the at least one first event associated with packing of the at least one container and (ii) at least partially actuating at least some of the two or more actuatable cushioning elements internal of the at least one container in response to the at least one second event associated with movement of the at least one container.

* * * * *